United States Patent
Kim et al.

(10) Patent No.: US 9,710,910 B2
(45) Date of Patent: Jul. 18, 2017

(54) IMAGE REGISTRATION DEVICE, IMAGE REGISTRATION METHOD, AND ULTRASONIC DIAGNOSIS APPARATUS HAVING IMAGE REGISTRATION DEVICE

(71) Applicant: SAMSUNG ELECTRONICS CO., LTD., Suwon-si (KR)

(72) Inventors: Sunkwon Kim, Suwon-si (KR); Jungwoo Chang, Seoul (KR); Won-chul Bang, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 32 days.

(21) Appl. No.: 14/753,394

(22) Filed: Jun. 29, 2015

(65) Prior Publication Data
US 2016/0093050 A1 Mar. 31, 2016

(30) Foreign Application Priority Data
Sep. 30, 2014 (KR) .................... 10-2014-0131452

(51) Int. Cl.
*G06K 9/00* (2006.01)
*G06T 7/00* (2017.01)
*G06K 9/46* (2006.01)
*G06K 9/36* (2006.01)
*G06K 9/62* (2006.01)
*G06T 7/33* (2017.01)

(52) U.S. Cl.
CPC ............. *G06T 7/0028* (2013.01); *G06K 9/36* (2013.01); *G06K 9/46* (2013.01); *G06K 9/6203* (2013.01); *G06T 7/33* (2017.01); *G06T 2207/10072* (2013.01); *G06T 2207/10132* (2013.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 6,069,696 A * | 5/2000 | McQueen | ........... | G01G 19/4144 235/383 |
| 9,008,365 B2 * | 4/2015 | Xu | ...................... | G06K 9/00369 382/103 |
| 2006/0257027 A1 * | 11/2006 | Hero | .................... | G06K 9/6892 382/190 |
| 2009/0285460 A1 * | 11/2009 | Ishikawa | ................. | G06K 9/48 382/128 |
| 2010/0266179 A1 * | 10/2010 | Ramsay | ................ | G06T 7/0012 382/131 |
| 2013/0051646 A1 * | 2/2013 | Nakano | ............... | G06F 19/3487 382/131 |
| 2016/0063720 A1 * | 3/2016 | Han | ........................ | G06T 7/10 382/131 |

* cited by examiner

Primary Examiner — Atiba O Fitzpatrick
(74) Attorney, Agent, or Firm — Sughrue Mion, PLLC

(57) ABSTRACT

There is provided an image registration device and an image registration method. The device includes: a feature extractor configured to extract, from a first image, a first feature group and to extract, from a second image, a second feature group; a feature converter configured to convert, using a converted neural network in which a correlation between features is learned, the extracted second feature group to correspond to the extracted first feature group, to obtain a converted group; and a register configured to register the first image and the second image based on the converted group and the extracted first feature group.

26 Claims, 29 Drawing Sheets

IMAGE REGISTRATION DEVICE, IMAGE REGISTRATION METHOD, AND ULTRASONIC DIAGNOSIS APPARATUS HAVING IMAGE REGISTRATION DEVICE

CROSS-REFERENCE TO RELATED APPLICATION

This application claims priority from Korean Patent Application No. 10-2014-131452, filed on Sep. 30, 2014 in the Korean Intellectual Property Office, the disclosure of which is incorporated herein by reference in its entirety.

BACKGROUND

1. Field

Apparatuses and methods consistent with exemplary embodiments relate to image registration of medical images.

2. Description of the Related Art

A medical imaging device is a device for obtaining information on a patient and providing the obtained information in an image. The medical imaging device includes an X-ray device, an ultrasound medical device, a computed tomography device, a magnetic resonance imaging device, and the like. Each medical imaging device has advantages and disadvantages.

For example, the magnetic resonance imaging device has no radiation exposure, has relatively free image capturing conditions, and provides excellent contrast in soft tissues and various diagnosis information images, but takes a relatively long time to obtain an image and is more costly. Also, the computed tomography device has a short image obtaining time and has a low cost, but does not provide a relatively high resolution and exposes patients to radiation.

Therefore, in order to accurately diagnose an object, there is a need to register and provide images obtained by medical devices having different modalities.

SUMMARY

Aspects of one or more exemplary embodiments relate to an image registration device configured to register images obtained by diagnostic devices having different modalities, and a method of controlling the same.

According to an aspect of an exemplary embodiment, there is provided an image registration device, including: a feature extractor configured to extract, from a first image, a first feature group and to extract, from a second image, a second feature group; a feature converter configured to convert, using a converted neural network in which a correlation between features is learned, the extracted second feature group to correspond to the extracted first feature group, to obtain a converted group; and a register configured to register the first image and the second image based on the converted group and the extracted first feature group.

The register may be configured to determine a registration function based on an error between the converted group and the extracted second feature group, and to register the first image and the second image by applying the determined registration function.

The converted neural network may be trained without supervision based on the registered image.

The converted neural network may be trained without supervision according to a relation between features extracted from a same part of the registered image.

The converted neural network may have a multilayer perceptron structure.

The device may further include: a first feature neural network in which extraction of the first feature group is learned without supervision using a plurality of first images corresponding to a first modality of medical device; and a second feature neural network in which extraction of the second feature group is learned without supervision using a plurality of second images corresponding to a second modality of medical device.

The feature extractor may be configured to extract features of the first image and the second image based on the first feature neural network and the second feature neural network, respectively.

The first image may be a medical image obtained in real time, and the second image may be a pre-obtained medical image.

The first image may be an ultrasound image, and the second image may be an image of a computed tomography image, a magnetic resonance image, a positron emission tomography image, or a single photon emission computed tomography image.

The first image may be a pre-obtained medical image, and the second image may be obtained in real time.

The first image and the second image may be obtained by medical devices having different modalities.

According to an aspect of another exemplary embodiment, there is provided an image registration method, including: extracting, from a first image, a first feature group and extracting, from a second image, a second feature group; converting, using a converted neural network in which a correlation between features is learned, the extracted first feature group to correspond to the extracted second feature group, to obtain a converted group; and registering the first image and the second image based on the converted group and the extracted second feature group.

The registering may include: determining a registration function based on an error between the converted group and the extracted second feature group; and applying the determined registration function to one of the first image and the second image.

The extracting may include: extracting the first feature group using a first feature neural network in which feature extraction is learned without supervision using a plurality of first images corresponding to a first modality of medical device; and extracting the second feature group using a second feature neural network in which feature extraction is learned without supervision using a plurality of second images corresponding to a second modality of medical device.

The first feature neural network, the second feature neural network, and the converted neural network may each have a multilayer perceptron structure.

According to an aspect of another exemplary embodiment, there is provided an ultrasonic diagnosis apparatus, including: an image obtainer configured to obtain an ultrasound image of a subject; a feature extractor configured to extract, from a medical image obtained in advance by imaging the subject, a first feature group and to extract, from the obtained ultrasound image, a second feature group; a feature converter configured to convert, using a converted neural network in which a correlation between features is learned, the extracted first feature group and the extracted second feature group into a same feature space; and a register configured to register the obtained ultrasound image and the obtained medical image based on the first feature group and the second feature group converted into the same feature space.

The first feature group may be generated by a first feature neural network that is trained without supervision in advance based on a plurality of medical images, and the second feature group is generated by a second feature neural network that is trained without supervision in advance based on a plurality of medical images.

The apparatus may further include a communicator configured to receive the medical image from an external device.

The register may be configured to determine a registration function based on an error between the first feature group and the second feature group converted into the same feature space, to apply the determined registration function to the medical image, and to register the medical image and the ultrasound image.

The converted neural network may be trained with supervision based on the registered image.

According to an aspect of another exemplary embodiment, there is provided an image registration device, including: a feature converter configured to obtain a converted group by converting, using a converted neural network in which a correlation between features is learned, a second feature group to correspond to a first feature group, the second feature group obtained from a second image corresponding to a second modality of medical device and the first feature group obtained from a first image corresponding to a first modality of medical device; and a register configured to register the first image and the second image based on the converted group and the extracted first feature group.

The register may be configured to determine a registration function based on an error between the converted group and the extracted second feature group, and to register the first image and the second image by applying the determined registration function.

The converted neural network may be trained without supervision based on the registered image.

The converted neural network may have a multilayer perceptron structure.

The first image may be a medical image obtained in real time, and the second image may be a pre-obtained medical image; or the second image may be the medical image obtained in real time, and the first image may be the pre-obtained medical image.

According to an aspect of another exemplary embodiment, there is provided a non-transitory computer readable recording medium having recorded thereon a program executable by a computer for performing the above method.

BRIEF DESCRIPTION OF THE DRAWINGS

The above and/or other aspects will become more apparent by describing certain exemplary embodiments with reference to the accompanying drawings, in which.

DETAILED DESCRIPTION

Figure 1:
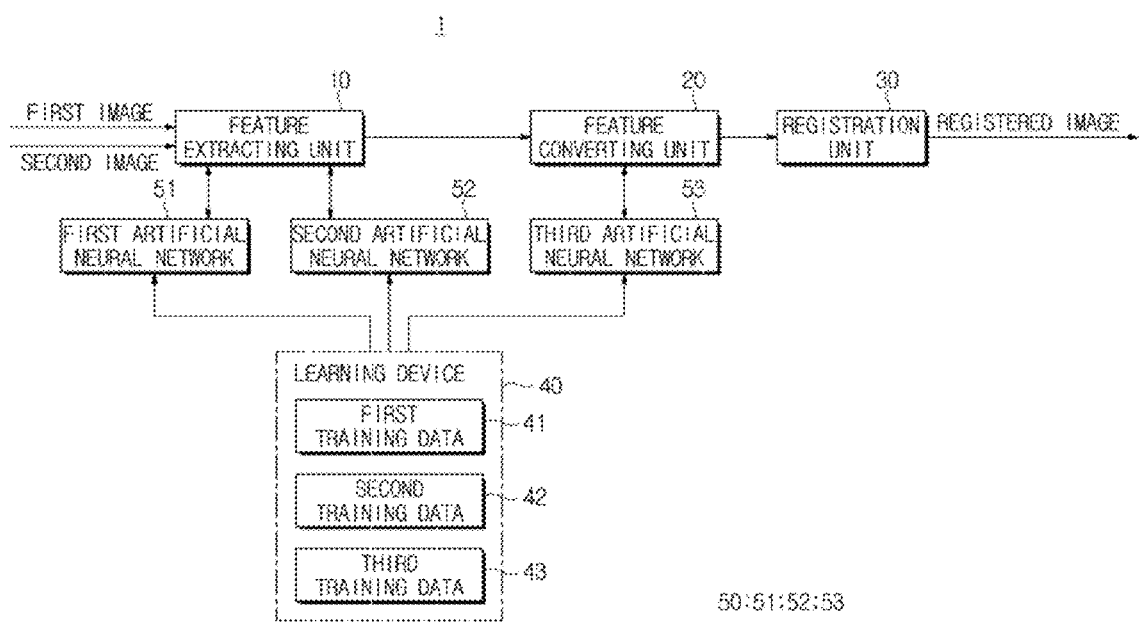
FIG. 1 is a control block diagram illustrating an image registration device according to an exemplary embodiment.

Advantages and features of exemplary embodiments, and methods of achieving the same will be clearly understood with reference to the accompanying drawings and the following detailed exemplary embodiments. However, the present inventive concept is not limited to exemplary embodiments described herein, but may be implemented in various different forms. Exemplary embodiments are provided in order to explain the present inventive concept for those skilled in the art. The scope of the present inventive concept is defined by the appended claims.

The terms used herein will be briefly described and exemplary embodiments will be described in detail.

Although the terms used herein are selected from among general terms that are currently and widely used in consideration of functions in exemplary embodiments, these may be changed according to intentions or customs of those skilled in the art or the advent of new technology. In addition, in a specific case, some terms may be arbitrary selected by applicants. In this case, meanings thereof will be described in a corresponding description of exemplary embodiments. Therefore, the meanings of terms used herein should be interpreted based on substantial meanings of the terms and content of this entire specification, rather than simply the terms themselves.

Throughout this specification, when a certain part "includes" a certain component, it means that another component may be further included not excluding another component unless otherwise defined. Moreover, terms described in the specification such as "part," "module," and "unit," refer to a unit of processing at least one function or operation, and may be implemented by software, a hardware component such as a field-programmable gate array (FPGA) or an application-specific integrated circuit (ASIC), or a combination of software and hardware. However, the terms "part," "module," "unit," and the like are not limited to software or hardware. "Part," "module," "unit," and the like may be configured in a recording medium that can be addressed or may be configured to be reproduced on at least one processor. Therefore, examples of the terms "part," "module," "unit," and the like include software components, object-oriented software components, components such as class components and task components, processes, functions, properties, procedures, subroutines, segments in program codes, drivers, firmware, microcode, circuits, data, databases, data structures, tables, arrays, and variables.

Hereinafter, exemplary embodiments will be described in detail with reference to the accompanying drawings. In addition, parts irrelevant to description are omitted in the drawings in order to clearly explain exemplary embodiments.

It will be understood that, although the terms "first," "second," etc., may be used herein to describe various elements, these elements should not be limited by these terms. These terms are only used to distinguish one element from another. For example, a first element could be termed a second element, and, similarly, a second element could be termed a first element, without departing from the scope of exemplary embodiments. As used herein, the term "and/or" includes any and all combinations of one or more of the associated listed items. Furthermore, expressions such as "at least one of," when preceding a list of elements, modify the entire list of elements and do not modify the individual elements of the list.

FIG. 1 is a control block diagram illustrating an image registration device 1 according to an exemplary embodiment. An image registration device 1 according to an exemplary embodiment may register different images. Here, the "image" may be obtained by imaging a subject using a medical device, and may include a two-dimensional (2D) image or a three-dimensional (3D) image.

For example, the image may be a medical image obtained by ultrasonography, magnetic resonance imaging (MRI), computed tomography (CT), positron emission tomography (PET), or single photon emission computed tomography (SPECT).

The "subject" may include a human, an animal, or a part thereof. For example, the subject may include organs such as a liver, a heart, a uterus, a brain, a breast, and an abdomen or blood vessels. Also, the subject may include a phantom.

The phantom may refer to a material having a density of an organism and a volume very close to an effective atomic number.

Images registered by the image registration device 1 may be obtained by medical devices having different modalities. An image to be image-registered may be obtained in advance, but one image may be obtained in real time and the other image may be a pre-obtained image. For example, the image registration device 1 may register an ultrasound image obtained in real time and a pre-obtained computed tomography image or a magnetic resonance image.

Hereinafter, for convenience of description, the image obtained in real time will be described as a first image, and the pre-obtained image will be described as a second image. However, the image obtained in real time may be the second image, and the pre-obtained image may be the first image.

The image registration device 1 may perform image registration using a plurality of pre-trained artificial neural networks 50 (51, 52, and 53). Although FIG. 1 illustrates three artificial neural networks 51, 52, and 53, it is understood that one or more other exemplary embodiments are not limited thereto, and the number of pre-trained artificial neural networks may be greater or less than three.

The image registration device 1 may include a feature extracting unit 10 (e.g., feature extractor) configured to extract features from the input first image and second image, a feature converting unit 20 (e.g., feature converter) configured to convert the features extracted from the first image and the second image into the same feature space, a registration unit 30 (e.g., register or registration device) configured to register the first image and the second image, and a learning device 40 configured to train the artificial neural network 50.

The feature extracting unit 10 extracts a feature group from the input image using a first artificial neural network 51 and a second artificial neural network 52.

The artificial neural network 50 is an engineering model of a human's brain structure in which efficient recognition actions occur. The artificial neural network 50 may be implemented by hardware, software, or a combination thereof.

The human brain includes a neuron that is a basic unit of a nerve. Each neuron is connected by a synapse, and may process information in a nonlinear and parallel manner.

The human brain learns by adjusting a connection type or a connection strength of a synapse. That is, the brain learns by adjusting the connection strength of a synapse such that a connection among neurons causing the wrong answer is weakened and a connection among neurons causing the correct answer is strengthened.

The artificial neural network 50 may include a plurality of units corresponding to neurons, and the plurality of units may be divided into a plurality of layers. The artificial neural network 50 may have various structures. For example, in units of the artificial neural network 50, only units included in adjacent layers may be connected according to a structure of a restricted Boltzmann machine.

The artificial neural network 50 may process information in a nonlinear and parallel manner through learning. Here, the learning refers to finding and generalization of a pattern from predetermined learning data. The artificial neural network 50 is trained by imitating the learning method of the human brain. Specifically, the artificial neural network 50 is trained by updating a connection strength among units causing the correct answer.

As described above, the first image and the second image are images obtained by medical devices having different modalities. The first image and the second image have different features. Therefore, in order to extract features from the first image and the second image, the different artificial neural networks 51 and 52 may be used.

The first artificial neural network 51 and the second artificial neural network 52 used for feature extraction are pre-trained by the learning device 40. Hereinafter, before operations of the feature extracting unit 10 are described in detail, the first artificial neural network 51 and the second artificial neural network 52, and training thereof will be described in detail.

Figure 2:
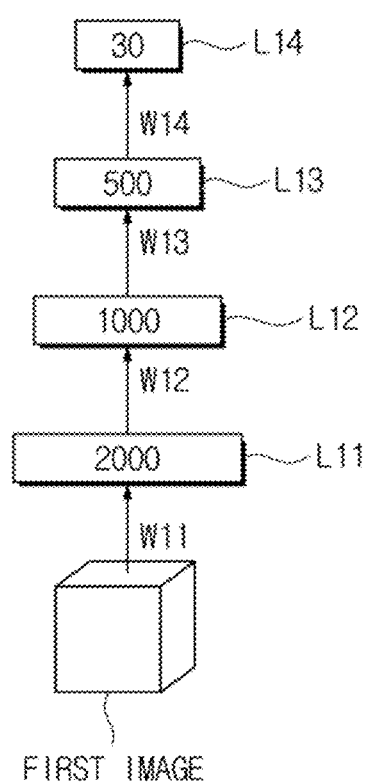
FIG. 2 is a diagram illustrating an exemplary first artificial neural network.
Figure 3:
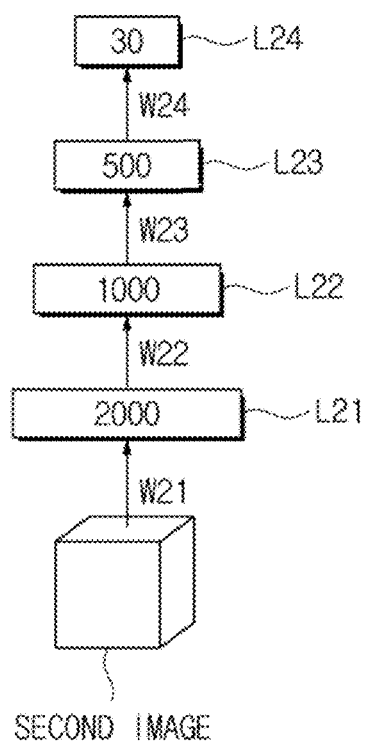
FIG. 3 is a diagram illustrating an exemplary second artificial neural network.

FIG. 2 is a diagram illustrating an exemplary first artificial neural network 51. FIG. 3 is a diagram illustrating an exemplary second artificial neural network 52.

Structures of the first artificial neural network 51 and the second artificial neural network 52 are not limited. However, the first artificial neural network 51 and the second artificial neural network 52 may have a multilayer perceptron structure. The multilayer perceptron structure is a structure in which a plurality of layers are provided between an input and an output.

For example, the first artificial neural network 51 may include a plurality of layers L11 to L14, as illustrated in FIG. 2. The plurality of layers L11 to L14 each may have a plurality of units. Specifically, the first layer L11 may include 2000 units, the second layer L12 may include 1000 units, the third layer L13 may include 500 units, and the fourth layer L14 may include 30 units.

In units included in each of the layers L11 to L14 of the first artificial neural network 51, only units of adjacent layers may be connected according to a method of a restricted Boltzmann machine. In this case, connection strengths W11 to W14 of the units are determined by learning without supervision to be described below.

Also, as illustrated in FIG. 3, the second artificial neural network 52 may include a plurality of layers L21 to L24 having a plurality of units. The plurality of layers L21 to L24 each may have a plurality of units. Specifically, the first layer L21 may include 2000 units, the second layer L22 may include 1000 units, the third layer L23 may include 500 units, and the fourth layer L24 may include 30 units.

In units included in each of the layers L21 to L24 of the second artificial neural network 52, only units of adjacent layers may be connected according to a method of a restricted Boltzmann machine. Connection strengths W21 and W24 of the units may be determined by learning to be described below.

Although FIG. 3 illustrates the second artificial neural network 52 having the same structure as the first artificial neural network 51 in FIG. 2, it is understood that one or more other exemplary embodiments are not limited thereto. For example, according to another exemplary embodiment, the second artificial neural network 52 and the first artificial neural network 51 may have different structures. For example, the number of units included in the fourth layer L14 of the first artificial neural network 51 may be more than or less than the number of units included in the fourth layer L24 of the second artificial neural network 52, and the second artificial neural network 52 may include more or less layers than the first artificial neural network 51.

The learning device 40 may perform unsupervised learning of the first artificial neural network 51 and the second artificial neural network 52. Here, the unsupervised learning is a method of updating the connection strengths W11 to W14 using training data 41 and 42 including only inputs. Through the unsupervised learning, the first artificial neural network 51 and the second artificial neural network 52 are trained to extract feature(s) from the input image. The feature(s) extracted from the image may be represented as a feature vector. The feature vector is a geometrical expression of features of the image, and may be represented as a predetermined matrix.

Different training data 41 and 42 may be used for unsupervised learning of the first artificial neural network 51 and unsupervised learning of the second artificial neural network 52. That is, first training data 41 may be used for unsupervised learning of the first artificial neural network 51, and second training data 42 may be included for unsupervised learning of the second artificial neural network 52.

In this case, the first training data 41 includes a plurality of images obtained by a diagnostic device having the same modality as a diagnostic device by which the first image is obtained. The second training data 42 includes a plurality of images obtained by a diagnostic device having the same modality as a diagnostic device by which the second image is obtained.

In this manner, training data 41 and 42 used for learning of the first artificial neural network 51 and the second artificial neural network 52 are different. Even when the first artificial neural network 51 and the second artificial neural network 52 have the same structure, the connection strengths W11 to W14 of the first artificial neural network 51 and the connection strengths W21 to W24 of the second artificial neural network 52 are different.

Figure 4:
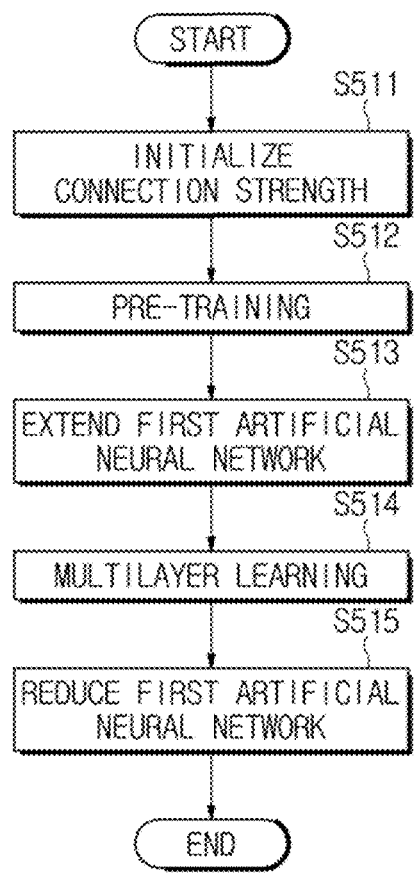
FIG. 4 is a flowchart illustrating an unsupervised learning method of a first artificial neural network.

FIG. 4 is a flowchart illustrating an unsupervised learning method of a first artificial neural network 51 according to an exemplary embodiment.

As illustrated in FIG. 4, the learning device 40 initializes the connection strengths W11 to W14 of the first artificial neural network 51 (operation S511). For example, the learning device 40 sets the first connection strength to the fourth connection strength W11 to W14 to preset initial values.

Figure 5:
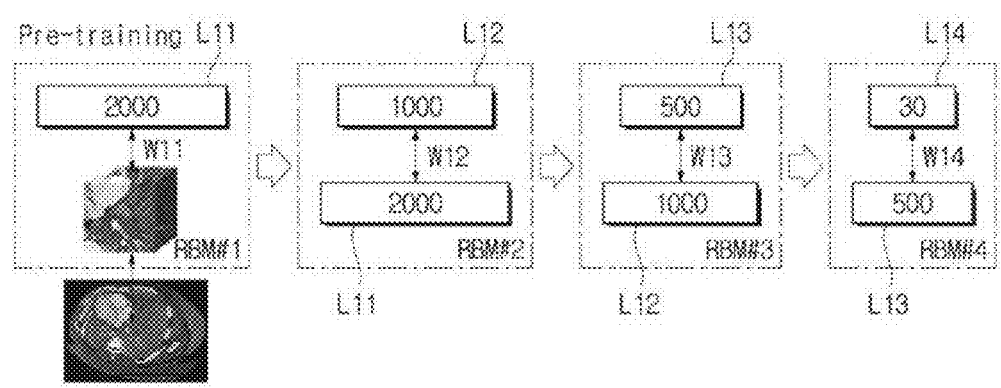
FIG. 5 is a diagram illustrating pre-training of a first artificial neural network.

The learning device 40 performs pre-training of the first artificial neural network 51 (operation S512). The first connection strength to the fourth connection strength W11 to W14 are learned through pre-training. FIG. 5 is a diagram illustrating pre-training of a first artificial neural network 51 according to an exemplary embodiment.

As illustrated in FIG. 5, the first artificial neural network 51 may be separated into a plurality of restricted Boltzmann machines RBM #1 to RBM #4. The restricted Boltzmann machines RBM #1 to RBM #4 may be classified as a visible layer or a hidden layer. Here, the visible layer is a layer that is fixed in a specific state and the hidden layer is a layer that freely operates while the artificial neural network 50 is trained.

Since the visible layer is fixed in a pre-training operation, the connection strengths W11 to W14 of the restricted Boltzmann machines RBM #1 to RBM #4 may be pre-trained by adjusting the hidden layer.

Specifically, in the first restricted Boltzmann machine RBM #1, each unit of the visible layer may correspond to a pixel or a voxel of a patch image Pi separated from a training image (Ti) included in the first training data 41, and each unit of the hidden layer may correspond to a feature. In this case, when it is assumed that the pixel or the voxel corresponding to each unit of the visible layer is in a binary state, a relation between each unit of the visible layer and each unit of the hidden layer may be represented as the following [Equation 1].

$$E(v, h) = -\sum_{i \in pixels} b_i v_i - \sum_{j \in features} b_j h_j - \sum_{i,j} v_i h_j w_{ij} \quad \text{[Equation 1]}$$

Here, $v_i$ denotes a binary state of an i-th pixel, $h_j$ denotes a binary state of a j-th feature, $b_i$ is a bias of an i-th pixel, $b_j$ denotes a bias of a j-th feature, and $w_{ij}$ denotes a connection strength between the i-th pixel and the j-th feature.

In this case, the bias and the connection strength may be adjusted such that energy of an image similar to the patch image Pi is increased and energy of an image dissimilar to the patch image Pi is decreased.

Pre-training of the first connection strength W11 may be iteratively performed such that energy of a similar image is increased and energy of a dissimilar image is decreased. When a change in the first connection strength W11 satisfies a preset condition through iterative learning, the pre-training of the first connection strength W11 is completed. For example, the first connection strength W11 may be adjusted until the first connection strength W11 is changed no longer or is changed to a threshold value or less while the patch image Pi is input.

When the first connection strength W11 of the first restricted Boltzmann machine RBM #1 is pre-trained in this manner, the second connection strength W12 of the second restricted Boltzmann machine RBM #2 is pre-trained. In this case, the first layer L11 used as the hidden layer in pre-training of the first restricted Boltzmann machine RBM #1 becomes the visible layer, and the second layer L12 becomes the hidden layer.

Also, when pre-training of the second connection strength W12 is completed, the third connection strength W13 is pre-trained using the second layer L12 as the visible layer and the third layer L13 as the hidden layer. When pre-training of the third connection strength W13 is completed, the fourth connection strength W14 may be pre-trained using the third layer L13 as the visible layer and the fourth layer L14 as the hidden layer.

The above pre-training process may be omitted in some cases. In order to prevent convergence to a local optimum, an initial connection strength may be determined through pre-training.

The learning device 40 extends the first artificial neural network 51 (operation S513). In order to apply an error backpropagation algorithm in the unsupervised learning, a layer for forming the input patch image again from the feature vector extracted from the input patch image is further included. Therefore, a layer for restoring the input image from features is added.

Figure 6:
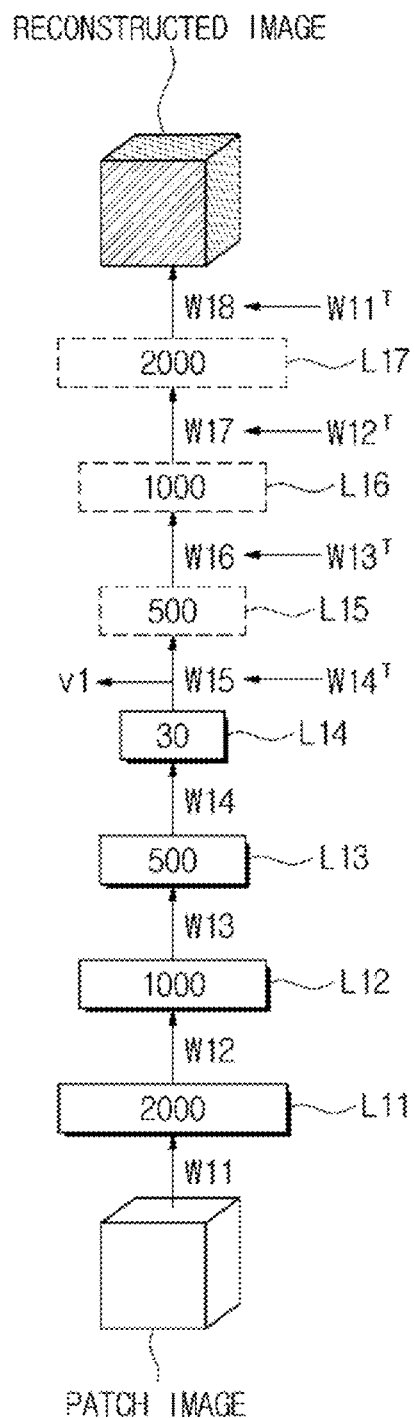
FIG. 6 is a diagram illustrating extension of a first artificial neural network for multilayer learning.

FIG. 6 is a diagram illustrating extension of a first artificial neural network 51 for multilayer learning according to an exemplary embodiment.

As illustrated in FIG. 6, when the patch image is input to the first artificial neural network 51, a feature vector V1 corresponding to the patch image input through the first to fourth layers L11 to L14 is output.

The learning device 40 adds, to the first artificial neural network 51, fifth to seventh layers L15 to L17 for reconstructing the image based on the feature vector. In this case, the fifth layer L15 corresponds to the third layer L13, the sixth layer L16 corresponds to the second layer L12, and the seventh layer L17 corresponds to the first layer L11.

Also, in order to restore the patch image from the feature vector again, the learning device 40 sets a fifth connection strength W15 between the fourth layer L14 and the fifth layer L15 as an inverse matrix of the fourth connection strength W14, sets a sixth connection strength W16 between the fifth layer L15 and the sixth layer L16 as an inverse matrix of the third connection strength W13, sets a seventh connection strength W17 between the sixth layer L16 and the seventh layer L17 as an inverse matrix of the second connection strength W12, and sets an eighth connection strength W18 between the seventh layer L17 and a reconstructed image as an inverse matrix of the first connection strength W11.

According to the fifth to seventh layers L15 to L17 added in this manner, the feature vector may be reconstructed as an image again. The image reconstructed by the fifth to seventh layers L15 to L17 is called a reconstructed image.

The learning device 40 performs multilayer learning of the first artificial neural network 51 (operation S514). The error backpropagation algorithm may be used for the multilayer learning. The error backpropagation algorithm is a learning method in which a connection strength is adjusted such that an input value matches an output value. The learning device 40 adjusts the first connection strength to the eighth connection strength W11 to W18 such that an error between the input patch image and the reconstructed image is decreased according to the error backpropagation algorithm.

Figure 7:
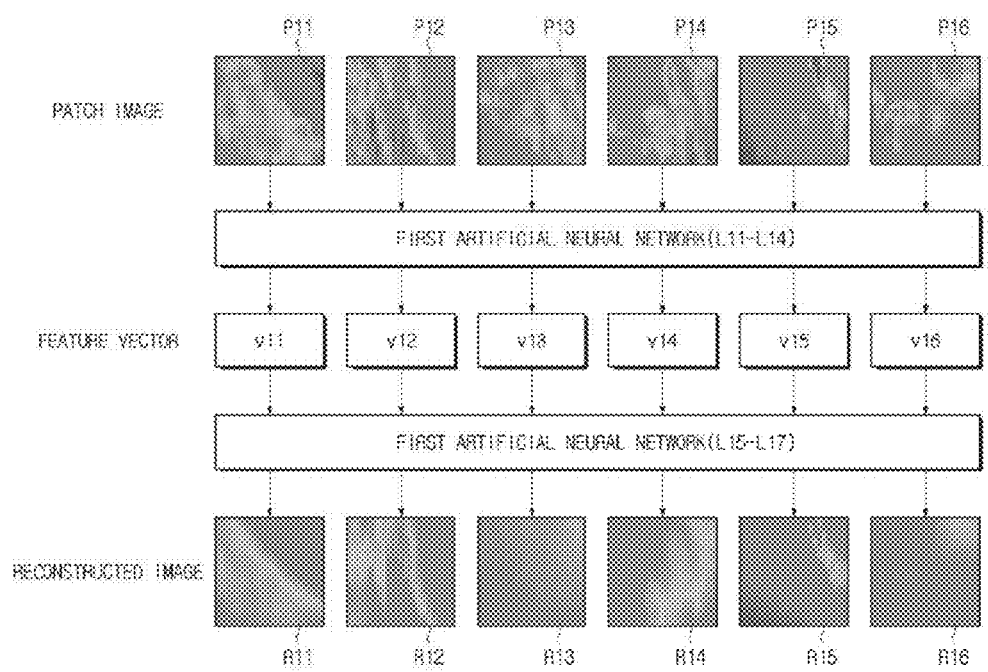
FIG. 7 is a diagram illustrating image reconstruction of a first artificial neural network.
Figure 8:
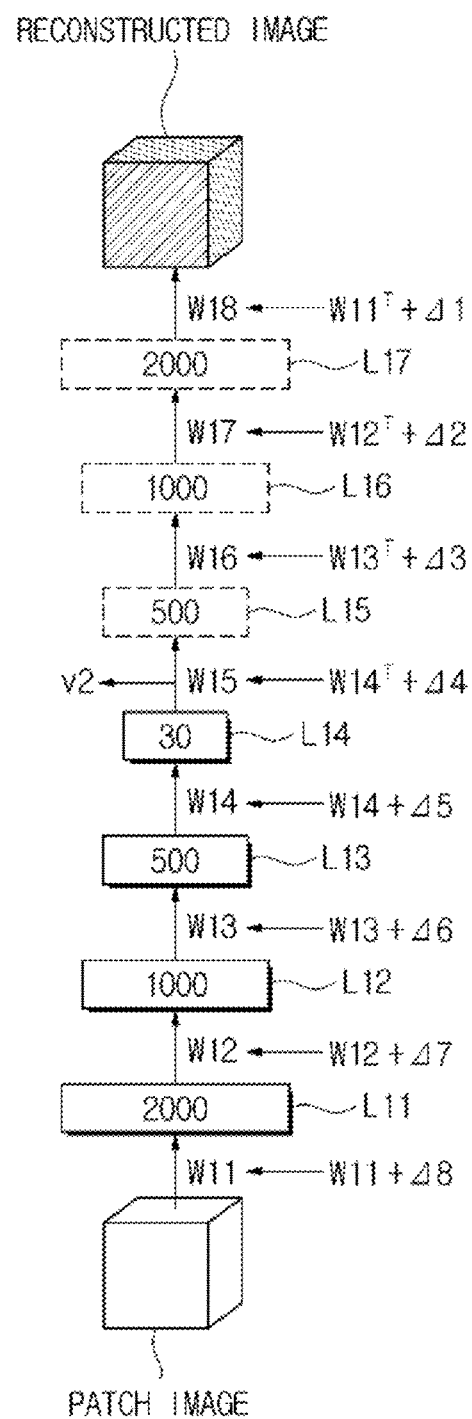
FIG. 8 is a diagram illustrating multilayer learning of a first artificial neural network.

FIG. 7 is a diagram illustrating image reconstruction of a first artificial neural network 51 according to an exemplary embodiment. FIG. 8 is a diagram illustrating multilayer learning of a first artificial neural network 51 according to an exemplary embodiment.

As illustrated in FIGS. 7 and 8, multilayer learning is performed using a plurality of patch images P11 to P16 separated from the first training data 41. Feature vectors V11 to V16 corresponding to the patch images P11 to P16 input by the first layer to fourth layer W11 to W14 are extracted. The feature vectors V11 to V16 are reconstructed as reconstructed images R11 to R16 by the fifth layer to the seventh layer W15 to W17.

The learning device 40 may adjust the connection strengths W11 to W18 of the first artificial neural network 51 such that an error between the input patch images P11 to P16 and the reconstructed images R11 to R16 is decreased. In this case, the connection strengths W11 to W18 may be adjusted in order from the eighth connection strength W18 closest to the reconstructed image to the first connection strength W11.

The learning device 40 sequentially determines delta values Δ1 to Δ8 of the eighth connection strength W18 to the first connection strength W11 such that an error between the patch images P11 to P16 and the reconstructed images R11 to R16 is decreased. Also, the learning device 40 sequentially applies the delta values Δ1 to Δ8 and corrects errors in order from the eighth connection strength W18 to the first connection strength W11.

Correction of the error may be iteratively performed based on a plurality of training images. In this case, since training of the first artificial neural network 51 may be finely performed as the number of training images increases, the first training data 41 may be big data.

In addition, error correction may be iteratively performed until the preset condition is satisfied. For example, the connection strengths W11 to W18 may be adjusted until errors no longer occur or errors equal to or less than the threshold value occur.

When multilayer learning is completed, the learning device 40 decreases or downsizes the artificial neural network 50 (operation S515). In this case, the fifth layer to seventh layer L15 to L17 extended to reconstruct the image based on the feature vector may be deleted.

Meanwhile, the learning device 40 may perform unsupervised learning of the second artificial neural network 52. The second artificial neural network 52 may be trained using the same method as the first artificial neural network 51 except that the second training data 42 is used for pre-training of the second artificial neural network 52.

Figure 9:
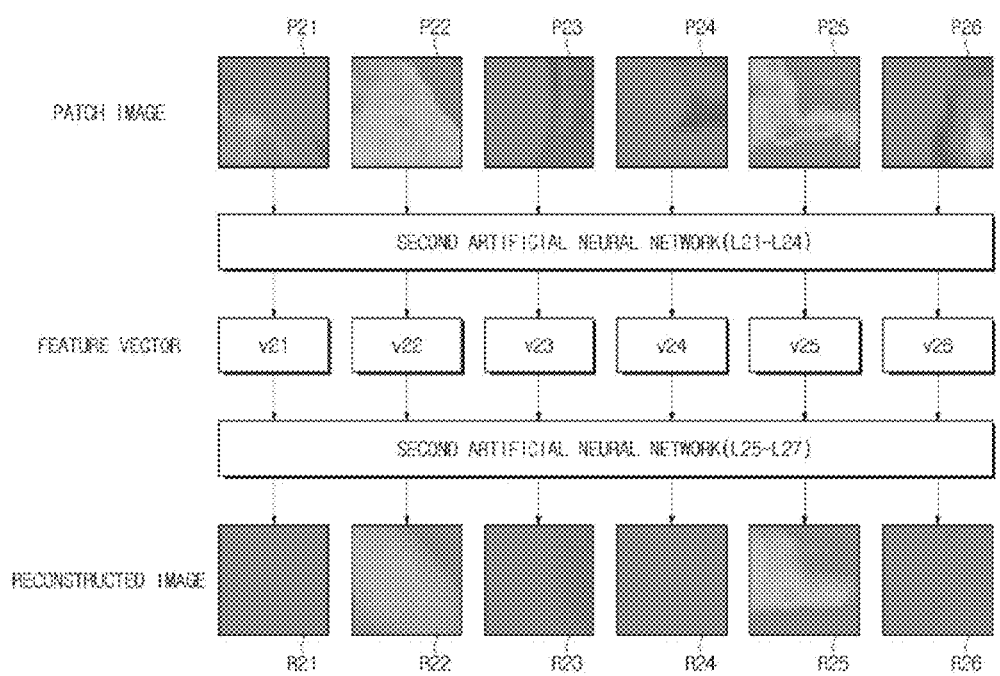
FIG. 9 is a diagram illustrating image reconstruction of a second artificial neural network.

FIG. 9 is a diagram illustrating image reconstruction of a second artificial neural network 52 according to an exemplary embodiment. In the present exemplary embodiment, the second training data 42 may be used for multilayer learning. As illustrated in FIG. 9, multilayer learning may be performed using a plurality of patch images P21 to P26 obtained by the second training data 42.

Specifically, the learning device 40 generates reconstructed images R21 to R26 based on feature vectors V21 to V26 corresponding to the input patch images P21 to P26, and adjusts connection strengths of the second artificial neural network 52 such that an error between the input patch images P11 to P16 and the reconstructed images R11 to R16 is decreased.

Hereinafter, operations of the feature extracting unit 10 will be described in detail.

The feature extracting unit 10 separates the plurality of patch images from each of the input first image and second image. In this case, an appropriate size of the patch image may be determined through an experiment. Patch images of the same size used for learning of the first artificial neural network 51 and the second artificial neural network 52 may be used.

Figure 10:
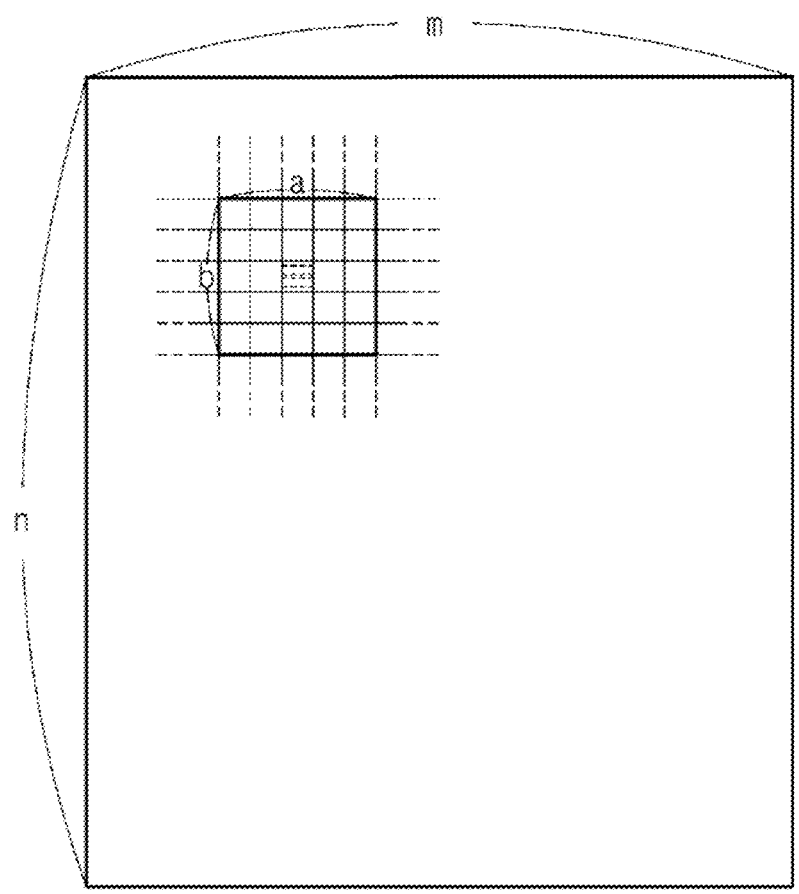
FIG. 10 is a diagram illustrating a separation of a patch image according to an exemplary embodiment.

FIG. 10 is a diagram illustrating a separation of a patch image according to an exemplary embodiment.

As illustrated in FIG. 10, when an input image has a size of m by n, the feature extracting unit 10 separates a patch image having a size of a by b from the input image. In this case, the patch image may be separated while moving according to a preset interval. For example, the patch image may be separated while moving vertically and horizontally in units of single pixels.

Also, since the first image and the second image may have different resolutions, the number of patch images separated from the first image and the second image may be different.

Furthermore, a size of the patch image separated from the first image and a size of the patch image separated from the second image may be different.

Moreover, the patch image may be obtained from only a predetermined region of interest set in the first image and the second image.

Meanwhile, when the input image is a 3D image, the patch image may include a plurality of voxels. That is, the patch image may have a size of x by y by z.

The feature extracting unit 10 may generate a feature vector group by extracting a plurality of feature vectors from a plurality of patch image obtained from the image.

That is, since the first artificial neural network 51 is trained to extract features from the patch image of the first image, the feature extracting unit 10 may obtain a first feature vector group using the first artificial neural network 51.

The first feature vector group includes a plurality of first feature vectors generated by the plurality of patch images separated from the first image. In this case, each first feature vector represents features of a corresponding patch image, and may be extracted using the first artificial neural network 51 trained without supervision.

Figure 11:
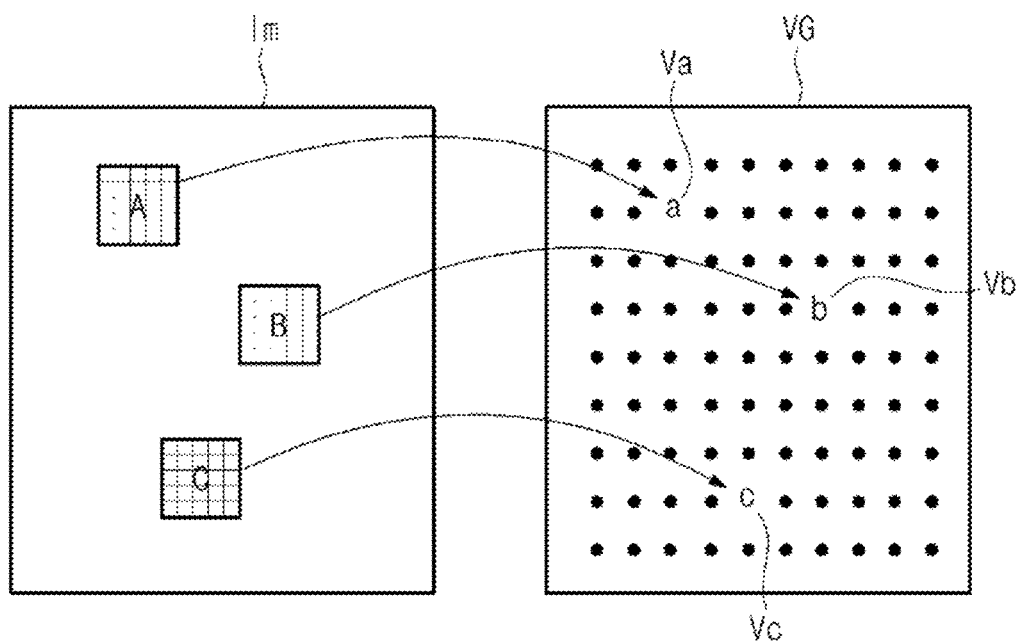
FIG. 11 is a diagram illustrating feature vector alignment of a feature vector group.

FIG. 11 is a diagram illustrating feature vector alignment of a feature vector group according to an exemplary embodiment.

As illustrated in FIG. 11, a first feature vector included in a first feature vector group (VG) may be aligned based on a position of a corresponding patch image.

The first feature vector group (VG) includes a plurality of first feature vectors (VGs) extracted from the plurality of patch images separated from a first image (Im). The plurality of first feature vectors are aligned according to a position of the patch image.

For example, a first feature vector (Va) of the patch image separated based on a pixel A in the first image (Im) is aligned in a position "a" of the first feature vector group (VG) corresponding to the pixel A of the first image (Im), a first feature vector (Vb) of the patch image separated based on a pixel B in the first image (Im) is aligned in a position "b" of the first feature vector group (VG) corresponding to the pixel B of the first image (Im), and a first feature vector (Vc) of the patch image separated based on a pixel C in the first image (Im) is aligned in a position "c" of the first feature vector group (VG) corresponding to the pixel C of the first image (Im).

Further, the feature extracting unit 10 extracts a second feature vector group from the input second image using the second artificial neural network 52. The second feature vector group includes a plurality of second feature vectors. The second artificial neural network 52 used for extracting the second feature vector is trained by the above-described unsupervised learning method.

In this case, the second feature vector group may be aligned using the same or similar method as the first feature vector group.

Since features of the first image and the second image are extracted using the first artificial neural network 51 and second artificial neural network 52 trained without supervision, features hidden in the first image and the second image may be extracted.

Figure 12:
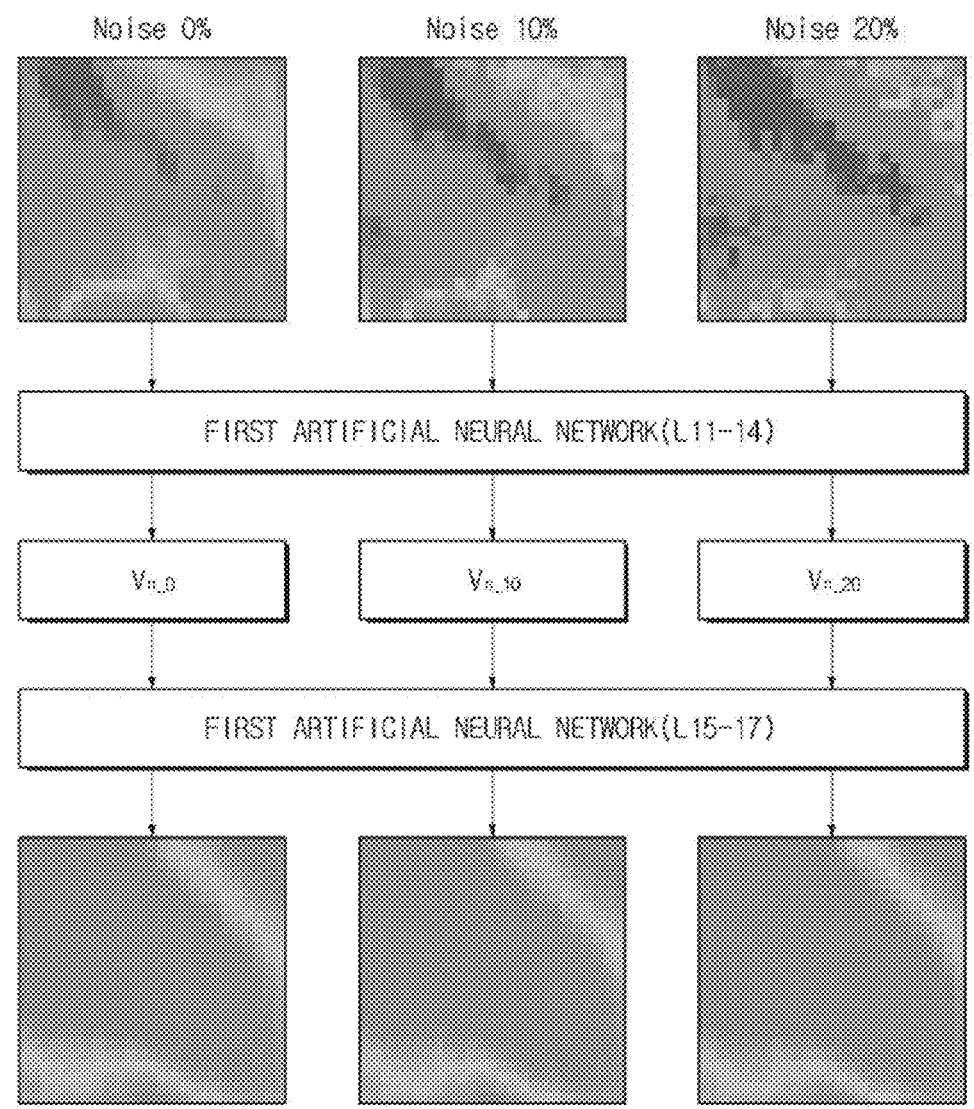
FIG. 12 is a diagram illustrating feature extraction using a first artificial neural network in various noise environments.

Also, since features of the first image and the second image are generalized using the first artificial neural network 51 and the second artificial neural network 52 trained without supervision, it is possible to effectively obtain the feature vector even when the image includes noise. FIG. 12 is a diagram illustrating feature extraction using a first artificial neural network 51 in various noise environments according to an exemplary embodiment.

As illustrated in FIG. 12, the patch image reconstructed based on first feature vectors Vn_10 and Vn_20 obtained in the noise environment is similar to the patch image reconstructed based on a first feature vector Vn_0 obtained in a noise-free environment. That is, since the first artificial neural network 51 and the second artificial neural network 52 trained using a plurality of images have a high generalization ability, features can be extracted without a significant influence from noise of the first image or the second image.

Referring again to FIG. 1, the feature converting unit 20 converts the first feature vector group and the second feature vector group into the same feature space. As described above, the first image and the second image are medical images obtained by medical devices having different modalities. That is, the first image and the second image are obtained by different imaging methods.

Due to a difference of imaging methods in this manner, the first image and the second image may have no common feature or may have ambiguous common features. That is, in the image obtained by imaging the same region of the subject, a relatively robustly represented part may be different according to the imaging method. The same part of the subject may be differently represented in the image.

Since features of the first image and features of the second image are different, the features of the first image and the features of the second image may be converted to match before image registration is performed. In other words, the first feature vector group extracted from the first image and the second feature vector group extracted from the second image may be positioned in the same feature vector space for image registration.

The feature converting unit 20 may convert the second feature vector group into a first feature vector space using a third artificial neural network 53 in which a correlation between first features extracted from the first image and second features extracted from the second image is learned. Hereinafter, conversion of the feature vector will be described in detail.

Figure 13:
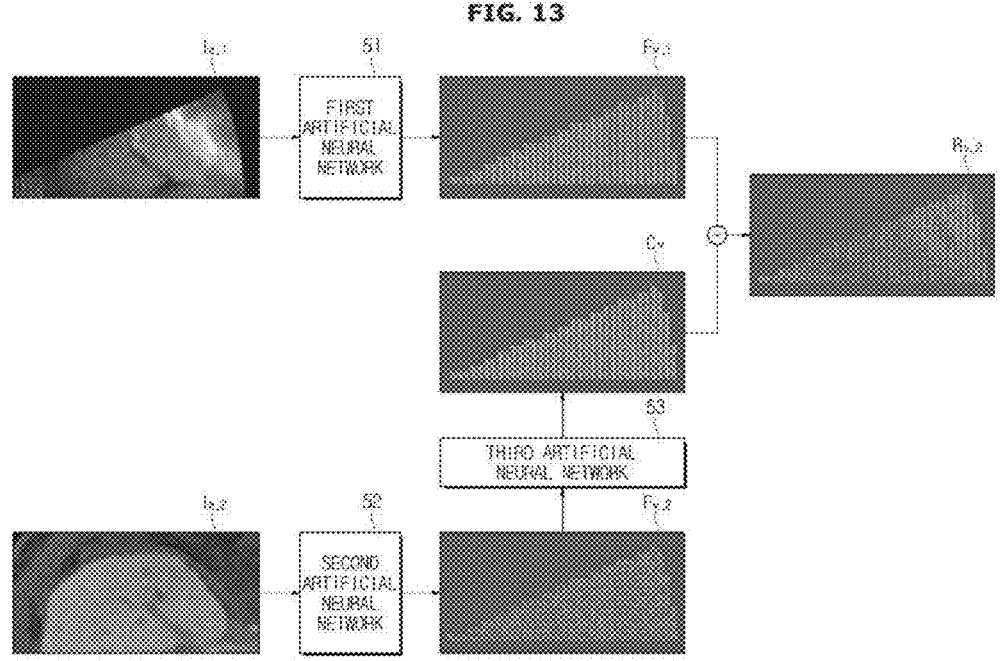
FIG. 13 is a diagram illustrating conversion of a feature vector space according to an exemplary embodiment.

FIG. 13 is a diagram illustrating conversion of a feature vector space according to an exemplary embodiment.

In FIG. 13, a first image (Im_1) is an ultrasound image, and a second image (Im_2) is a magnetic resonance image registered with the first image (Im_1). In this case, the first image (Im_1) and the second image (Im_2) are obtained by imaging the same part of the same subject. The first image (Im_1) and the second image (Im_2) are positioned in the same coordinate system.

As illustrated in FIG. 13, when a first feature vector group (Fv_1) and a second feature vector group (Fv_2) extracted from the registered first image (Im_1) and second image (Im_2) are visually represented, it can be understood that the first feature vector group (Fv_1) and the second feature vector group (Fv_2) are positioned in different feature vector spaces.

Therefore, the feature converting unit 20 may convert the second feature vector group (Fv_2) into the first feature vector space and generate a converted feature vector group (Cv) using the third artificial neural network 53 in which the correlation of the first feature and the second feature is learned without supervision.

That is, the feature converting unit 20 converts the second feature vector group (Fv_2) to correspond to the first feature vector group (Fv_1) based on a correlation between the first feature vector and the second feature vector and generates the converted feature vector group (Cv). The converted feature vector group (Cv) generated in this manner and the first feature vector group (Fv_1) are positioned in the same feature space, and a low error (Rv_2) is shown as illustrated in FIG. 13.

The feature converting unit 20 may convert the first feature vector group and the second feature vector group into the same feature space using the pre-trained third artificial neural network 53. A structure of the third artificial neural network 53 and a learning method thereof will now be described in detail.

Figure 14:
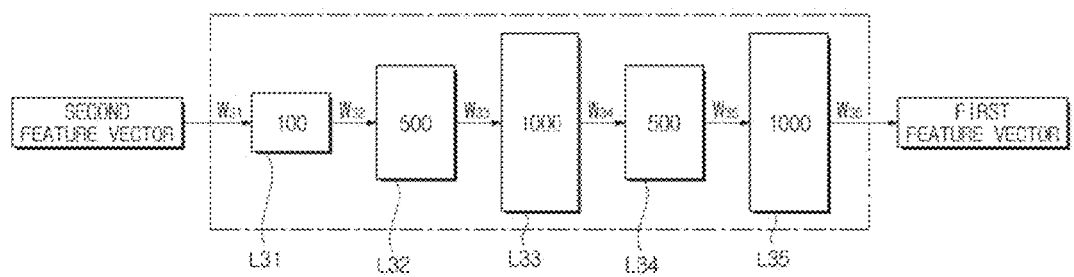
FIG. 14 is a diagram illustrating an exemplary third artificial neural network.

FIG. 14 is a diagram illustrating an example of the third artificial neural network 53 according to an exemplary embodiment.

The third artificial neural network 53 may have a multi-layer perceptron structure. For example, as illustrated in FIG. 11, the third artificial neural network 53 may include a plurality of conversion layers L31 to L35.

Also, the plurality of conversion layers L31 to L35 may include a plurality of units. As illustrated in FIG. 12, the first conversion layer L31 may include 100 units, the second conversion layer L32 may include 500 units, the third conversion layer L33 may include 1000 units, the fourth conversion layer L34 may include 500 units, and the fifth conversion layer L35 may include 1000 units. In units included in the conversion layers L31 to L35 of the third artificial neural network 53, only units of adjacent layers may be connected according to a method of a restricted Boltzmann machine.

In this case, converted connection strengths W31 to W36 of units are determined by supervised learning to be described below. In the supervised learning, training data including an input and an output is used to learn a correlation between the input and the output.

Specifically, training data of the third artificial neural network 53 includes the first feature vector and the second feature vector obtained in the same coordinates of the registered first image and second image. In this case, any feature vector of the first feature vector and the second feature vector becomes an input of the third artificial neural network 53, and the other feature vector becomes an output of the third artificial neural network 53.

Hereinafter, a supervised learning method will be described in detail with reference to FIGS. 14 to 16. However, unless otherwise specifically described, unsupervised learning may also be applied to learning with supervision.

Figure 15:
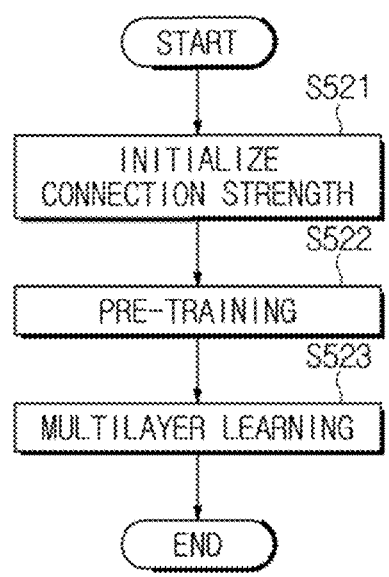
FIG. 15 is a flowchart illustrating a learning method of a third artificial neural network according to an exemplary embodiment.

FIG. 15 is a flowchart illustrating a learning method of a third artificial neural network according to an exemplary embodiment.

As illustrated in FIG. 15, the learning device initializes the connection strength of the third artificial neural network 53 (operation S521).

The learning device 40 performs pre-training of the third artificial neural network 53 (operation). As illustrated in FIG. 14, the third artificial neural network 53 may also be separated as a plurality of restricted Boltzmann machines RBM #1 to RBM #6, similar to the above-described first artificial neural network 51. The restricted Boltzmann machines RBM #1 to RBM #6 of the third artificial neural network 53 may be sequentially learned using the same or similar method as the above-described pre-training of the first artificial neural network 51.

That is, in the third artificial neural network 53, pre-training may be performed in an order of the first converted connection strength W31, the second converted connection strength W32, the third converted connection strength W33, the fourth converted connection strength W34, the fifth converted connection strength W35, and the sixth converted connection strength W36. Since the initial connection strengths W31 to W36 are determined through the pre-training, it is possible to prevent convergence to a local optimum.

The learning device 40 performs multilayer learning of the artificial neural network 50 (operation S523). The multilayer learning may proceed according to the error back-propagation algorithm.

In the multilayer learning operation, the converted connection strengths W31 to W36 of the third artificial neural network 53 are adjusted. Specifically, the converted connection strengths W31 to W36 are learned to output the second feature vector when the first feature vector is input. The plurality of converted connection strengths W31 to W36 are learned from the sixth converted connection strength W36 closer to an output end to the first converted connection strength W31 closer to an input end.

While third training data 43 has been described as the first feature vector and the second feature vector in FIG. 15, it is understood that one or more other exemplary embodiments are not limited thereto. For example, the third training data 43 may be the registered first image and second image in one or more other exemplary embodiments.

Figure 16:
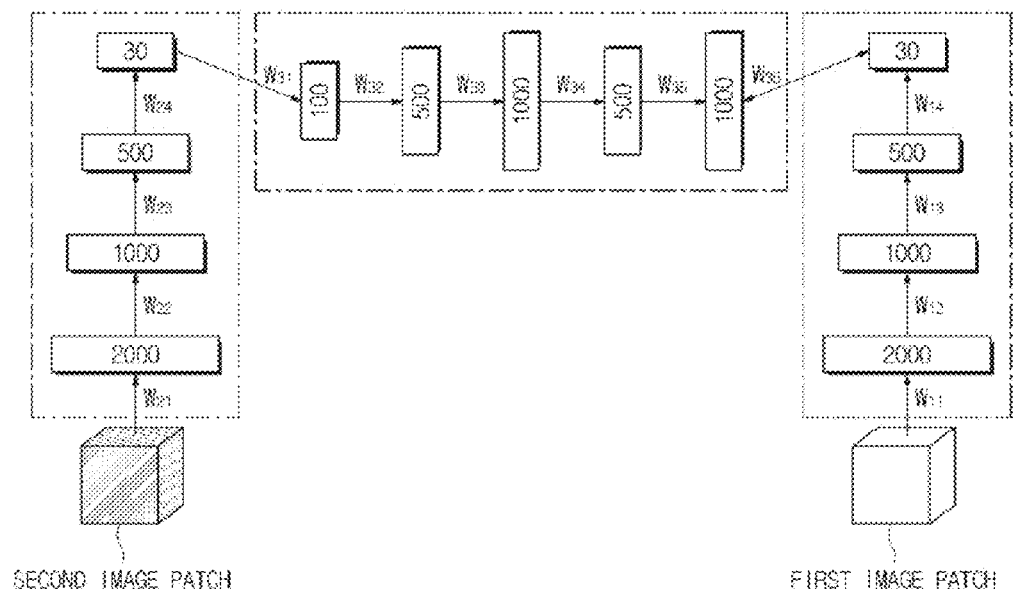
FIG. 16 is a diagram illustrating a learning method of a third artificial neural network based on a registered image.

FIG. 16 is a diagram illustrating a learning method of a third artificial neural network based on a registered image according to an exemplary embodiment.

As illustrated in FIG. 16, the first artificial neural network 51 and the second artificial neural network 52 trained without supervision may be used to perform training based on the registered image.

Specifically, an output end of the first artificial neural network 51 may be connected to an output end of the third artificial neural network 53, and an output end of the second artificial neural network 52 may be connected to an input end of the third artificial neural network 53, such that an output of the first artificial neural network 51 becomes an output of the third artificial neural network 53, and an output of the second artificial neural network 52 becomes an input of the third artificial neural network 53.

When the first image and the second image are input to the first artificial neural network 51 and the second artificial neural network 52, respectively, the first artificial neural network 51 outputs the first feature vector group corresponding to the input first image, and the second artificial neural network 52 outputs the second feature vector group corresponding to the input second image.

Also, the first feature vector group output using the first artificial neural network 51 becomes an output of the third artificial neural network 53, and the second feature vector group output using the second artificial neural network 52 becomes an input of the third artificial neural network 53.

The learning device 40 trains the third artificial neural network 53 such that an error between a feature vector group output when the second feature vector group is input to the third artificial neural network 53 and the first feature vector group is minimized.

Through learning in this manner, the third artificial neural network 53 learns a correlation between features of the first image and features of the second image.

Referring again to FIG. 1, the feature converting unit 20 converts the first feature vector group and the second feature vector group into the same feature vector space using the third artificial neural network 53 in which a correlation between features of the first image and features of the second image is learned using the above-described method.

That is, when the second feature vector extracted using the second artificial neural network 52 is input to the third artificial neural network 53, the third artificial neural network 53 outputs a conversion vector corresponding to the second feature vector according to the learned correlation. In this case, the conversion vector is the first feature vector corresponding to the input second feature vector.

Meanwhile, while it was described above that the second feature vector group is converted into the first feature vector space, it is understood that one or more other exemplary embodiments are not limited thereto. For example, the first feature vector group may be converted into a second feature vector space. However, when the first feature vector group is converted into the second feature vector space, an input and an output of the third training data 43 used for training the third artificial neural network 53 may be exchanged.

The registration unit 30 registers the first image and the second image. In image registration, images of different coordinate systems are converted into the same coordinate system. The registration unit 30 may perform movement translation, scaling translation, and rotation translation of the other image based on any image of the first image and the second image, convert coordinate systems of the first image and the second image to the same coordinate system, and register the first image and the second image.

The registration unit 30 may register the first image and the second image by applying a predetermined registration function to at least one image of the first image and the second image. In this case, the registration function is a function for converting the first image and the second image into the same coordinate system.

The registration unit 30 determines a parameter of the registration function based on the first feature vector group and the converted feature vector group. As described above, the first feature vector group represents features of the first image. In the converted feature vector group, features of the second image are converted into features of the first image and represented.

Therefore, the parameter of the registration function may be determined based on an error between the first feature vector group and the converted feature vector group. That is, the registration unit 30 may calculate an error between the first feature vector group and the converted feature vector group while changing the parameter of the registration function, and determine the parameter of the registration function based on the calculated error.

Also, the registration unit 30 applies the determined parameter of the registration function to the second image and converts a coordinate system of the second image into a coordinate system of the first image.

Figure 17:
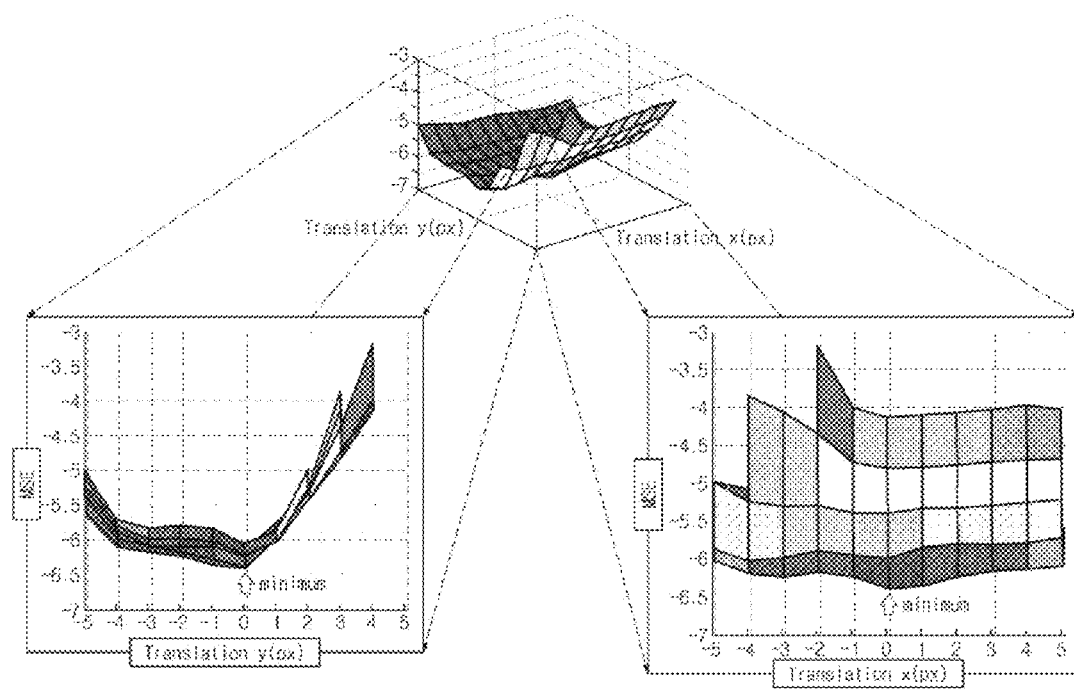
FIG. 17 is a diagram illustrating a determining of an image registration function according to an exemplary embodiment.

Hereinafter, an exemplary embodiment of determining a registration parameter will be described. FIG. 17 is a diagram illustrating an exemplary embodiment of determining an image registration function.

As illustrated in FIG. 17, the registration unit 30 changes the parameter of the registration function, moves coordinates of a converted feature group, and calculates an error between the first feature vector group and the converted feature vector group.

In this manner, the parameter of the registration function may be determined based on the error calculated according to movement of coordinates of the converted feature group. For example, a parameter in which errors of x and y axes are minimized may be determined as the parameter of the registration function.

Also, the registration unit 30 applies the determined parameter of the registration function to at least one image of the ultrasound image and the medical image, and generates a registered image by matching coordinate systems of the ultrasound image and the medical image.

The registration unit 30 applies the registration function, to the second image, according to the determined parameter, and converts the second image into the coordinate system of the first image.

Also, the registration unit 30 may generate the registered image by overlapping the first image and the second image positioned in the same coordinate system.

Figure 18:
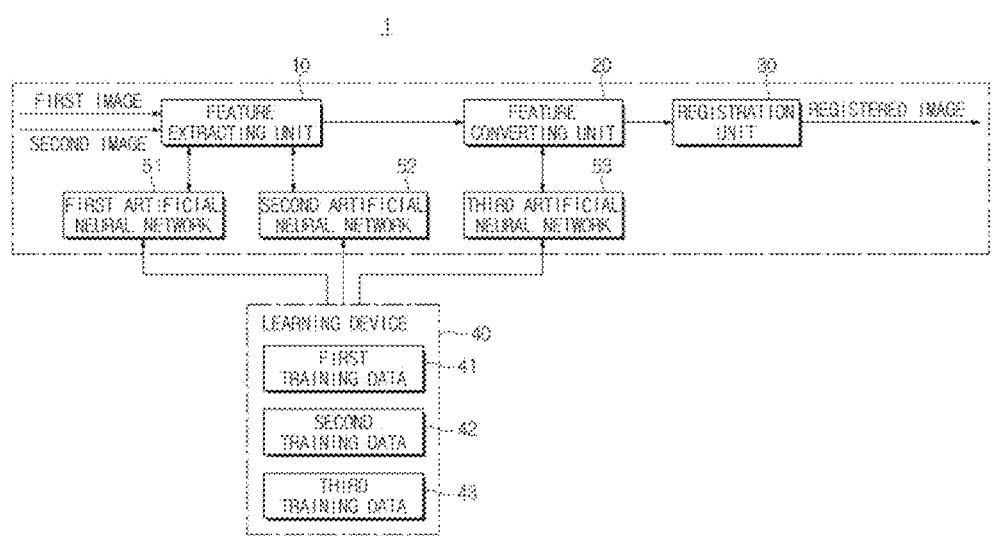
FIG. 18 is a control block diagram illustrating an image registration device according to an exemplary embodiment.

FIG. 18 is a control block diagram illustrating an image registration device 1 according to another exemplary embodiment.

While it was described in FIG. 1 that the learning device 40 is included in the image registration device 1, the learning device 40 may be separately provided from the image registration device 1 in another exemplary embodiment, as illustrated in FIG. 18. When the learning device 40 is separately provided in this manner, the first artificial neural network 51, the second artificial neural network 52, and the third artificial neural network 53 that are pre-trained by the learning device 40 may be applied to the image registration device 1.

Figure 19:
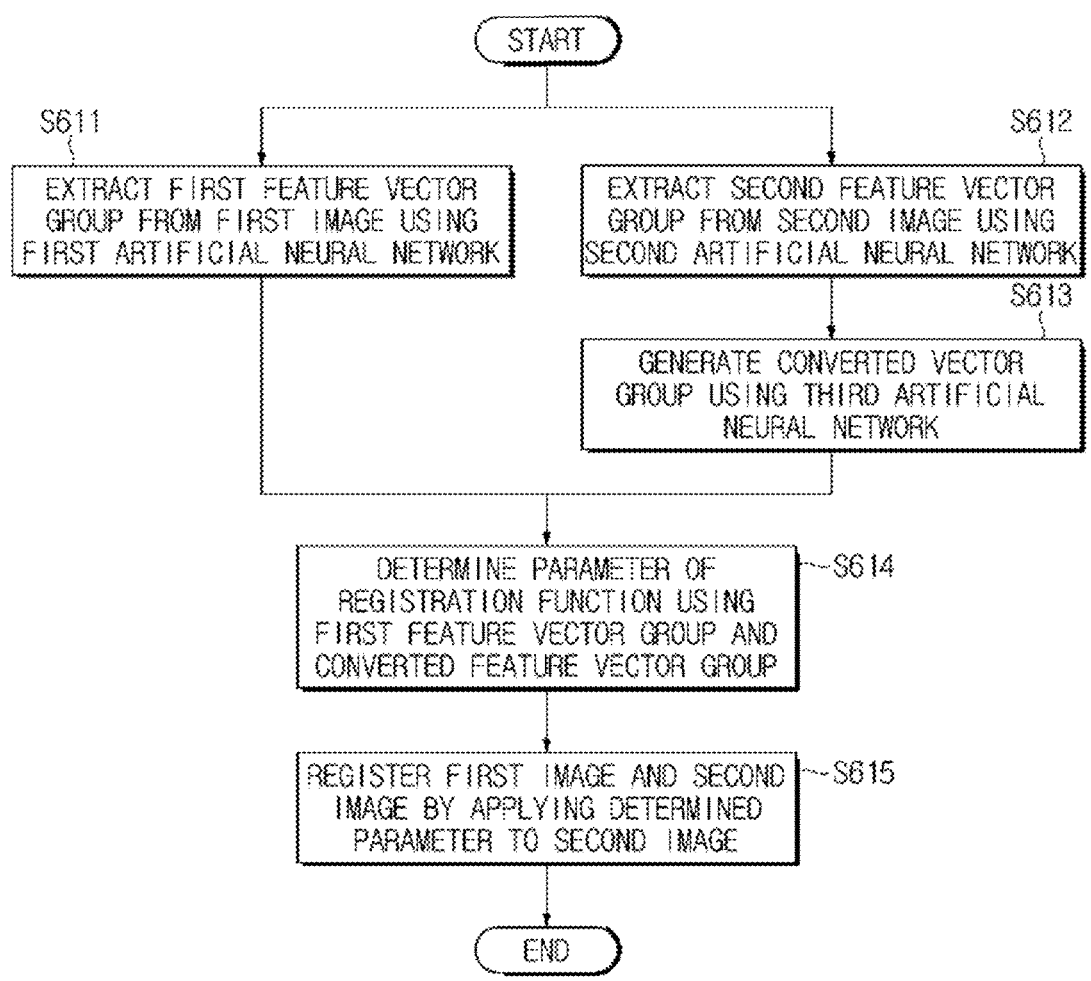
FIG. 19 is a flowchart illustrating a method of controlling an image registration device according to an exemplary embodiment.

FIG. 19 is a flowchart illustrating a method of controlling an image registration device 1 according to an exemplary embodiment.

As illustrated in FIGS. 1 and 19, the image registration device 1 extracts the first feature vector group from the first image using the first artificial neural network 51 (operation S611). In this case, as described above, the first artificial neural network 51 is trained without supervision based on the first training data 41, extracts features of the input first image, and outputs the result in the form of a feature vector.

The image registration device 1 extracts the second feature vector group from the second image using the second artificial neural network 52 (operation S612). In this case, as described above, the second artificial neural network 52 is trained without supervision based on the second training data 42, extracts features of the input second image, and outputs the result in the form of a feature vector.

The image registration device 1 generates a converted vector group using the third artificial neural network 53 (operation S613). The third artificial neural network 53, in which a correlation between the second feature vector and the first feature vector is learned, outputs the first feature vector corresponding to the input second feature vector. Therefore, the converted vector group may be obtained by inputting the second feature vector group to the third artificial neural network 53.

The image registration device 1 determines the parameter of the registration function using the first feature vector group and the converted feature vector group (operation S614). Since the first feature vector group and the converted feature vector group are positioned in the same feature vector space, the registration function for matching coordinate systems of the first image and the second image may be determined based on the first feature vector group and the converted feature vector group.

That is, the parameter of the registration function may be determined based on an error between the first feature vector group and the converted feature vector group. Specifically, the image registration device 1 may determine the parameter of the registration function such that an error between the first feature vector group and the converted feature vector group is minimized.

The image registration device 1 registers the first image and the second image by applying the determined parameter to the second image (operation S615).

Figure 20:
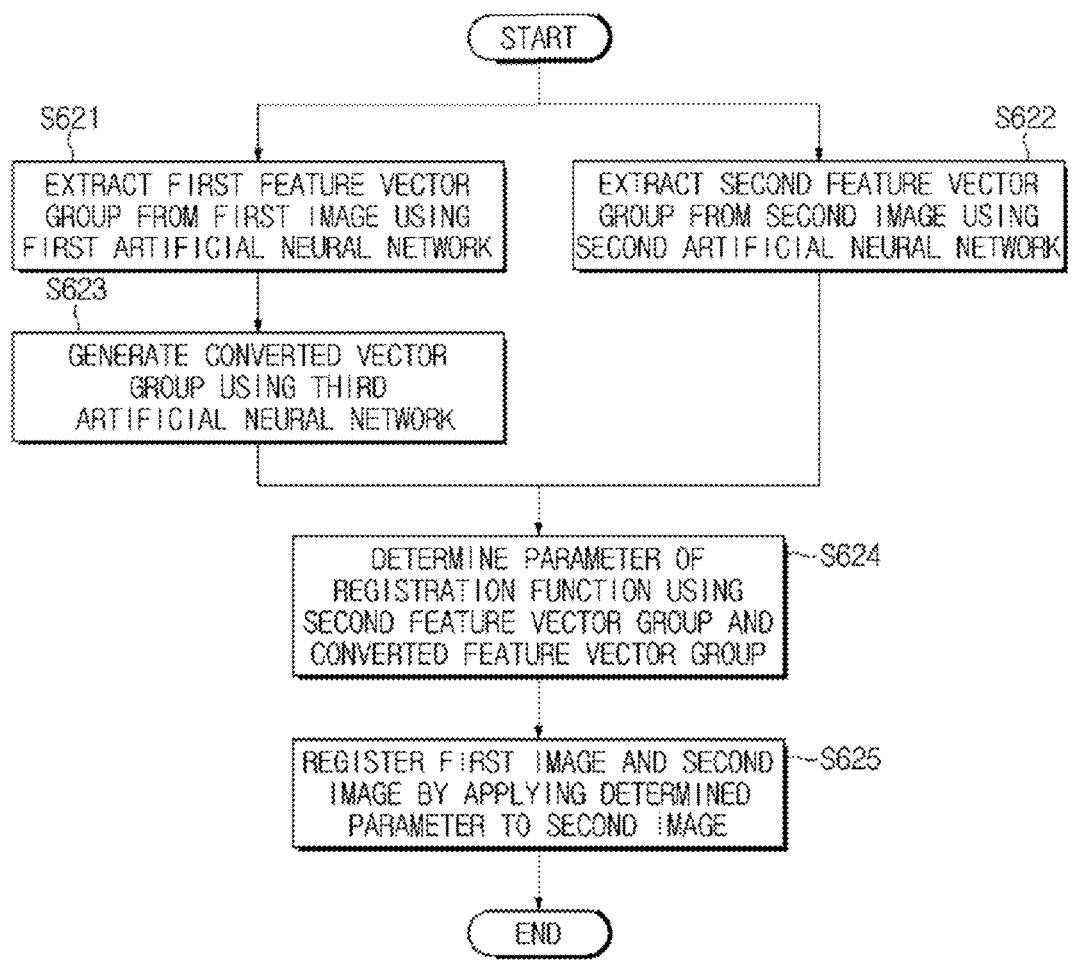
FIG. 20 is a flowchart illustrating a method of controlling an image registration device according to an exemplary embodiment.

FIG. 20 is a flowchart illustrating a method of controlling an image registration device 1 according to an exemplary embodiment.

As illustrated in FIGS. 1 and 20, the image registration device 1 extracts the first feature vector group from the first image using the first artificial neural network 51 (operation S621).

The image registration device 1 extracts the second feature vector group from the second image using the second artificial neural network 52 (operation S622).

The image registration device 1 generates the converted vector group using the third artificial neural network 53 (operation S623). The third artificial neural network 53, in which a correlation between the first feature vector and the second feature vector is learned, outputs the second feature vector corresponding to the input first feature vector. Therefore, the converted vector group may be obtained by inputting the first feature vector group to the third artificial neural network 53.

The image registration device 1 determines the parameter of the registration function using the second feature vector group and the converted feature vector group (operation S624).

The image registration device 1 registers the first image and the second image by applying the determined parameter to the second image (operation S625).

The above-described image registration device 1 may be applied to a predetermined medical device. For example, the image registration device 1 may be applied to an ultrasonic diagnosis apparatus configured to easily obtain an image of the subject in real time.

Figure 21:
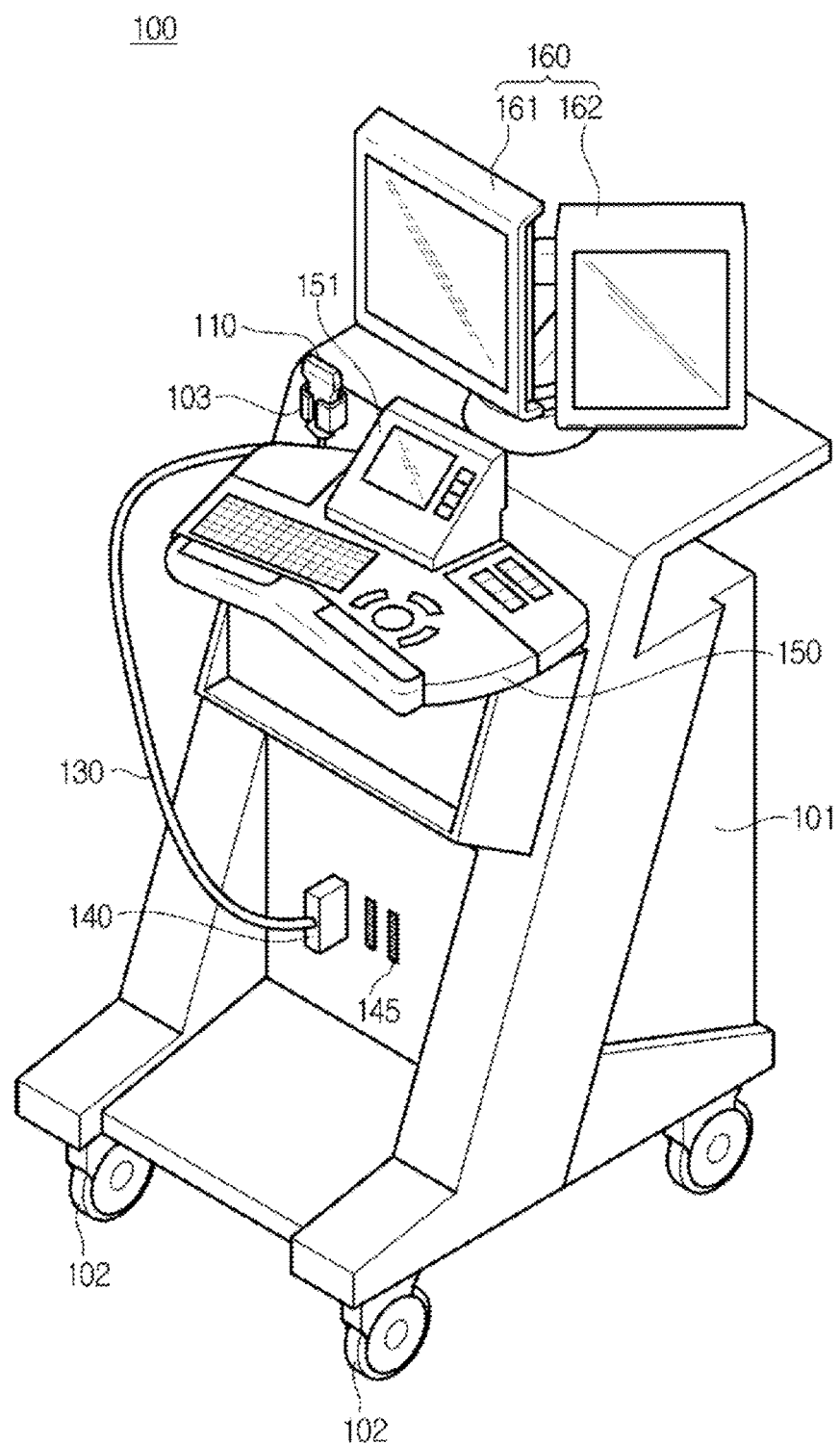
FIG. 21 is a perspective view illustrating an ultrasonic diagnosis apparatus according to an exemplary embodiment.

FIG. 21 is a perspective view illustrating an ultrasonic diagnosis 100 apparatus according to an exemplary embodiment. As illustrated in FIG. 21, an ultrasonic diagnosis apparatus 100 may include a probe 110, a main body 101, a manipulation panel 150, and a display unit 160 (e.g., display).

At least one connector 145 (e.g., female connector) may be provided in the front lower side of the main body 101. The connector 145 may be physically connected to another connector 140 (e.g., male connector) provided in an end of a cable 130. The ultrasound probe 110 and the main body 101 may be connected through the cable 130.

Meanwhile, a plurality of casters 111 for moving the ultrasound device may be provided below the main body 101. The user may fix the ultrasonic diagnosis apparatus 100 at a specific place or move the ultrasonic diagnosis apparatus 100 in a specific direction using the plurality of casters 111. Such an ultrasonic diagnosis apparatus 100 may be referred to as a cart type ultrasound device.

According to another exemplary embodiment, the ultrasonic diagnosis apparatus 100 may be a handheld ultrasound device that can be held when the user moves a long distance. In this case, the handheld ultrasound device may not include the caster 111. Examples of the handheld ultrasonic diagnosis apparatus 100 include a picture archiving and communication system (PACS) viewer, a smartphone, a laptop computer, a personal digital assistant (PDA), a tablet personal computer (PC), and the like, although it is understood that one or more other exemplary embodiments are not limited thereto.

The ultrasound probe 110 is a unit that comes in contact with a body surface of the subject, and may transmit and receive an ultrasound. Specifically, the ultrasound probe 110 generates the ultrasound according to an input pulse, transmits the ultrasound into an inside of the subject, and receives an echo ultrasound reflected from a specific region inside the subject.

The manipulation panel 150 is a unit configured to receive an instruction related to an operation of the ultrasonic diagnosis apparatus 100. The user may input an instruction for performing a diagnosis start, a diagnosis region selection, a diagnosis type selection, a mode selection for a final output ultrasound image, or the like through the manipulation panel 150. Exemplary modes of the ultrasound image may include an amplitude mode (A-mode), a brightness mode (B-mode), a Doppler mode (D-mode), an elastography mode (E-mode), and a motion mode (M-mode).

As an exemplary embodiment, the manipulation panel 150 may be provided above the main body 101 as illustrated in FIG. 21. In this case, the manipulation panel 150 may include at least one of a switch, a key, a wheel, a joystick, a trackball, and a knob.

Also, the manipulation panel 150 may further include a sub-display 151. The sub-display 51 may be provided in a side of the manipulation panel 150 and display information related to manipulation of the ultrasonic diagnosis apparatus 100.

For example, the sub-display 151 may display menus, announcements, and the like for setting the ultrasonic diagnosis apparatus 100, or may display current settings of the ultrasonic diagnosis apparatus 100.

In this case, the sub-display 151 may be implemented as a touch panel. When the sub-display 151 is implemented as the touch panel, the user may input a control instruction by touching the sub-display 151.

Such a sub-display 151 may be implemented as, for example, a liquid crystal display (LCD) panel, a light emitting diode (LED) panel, an organic light emitting diode (OLED) panel, an active matrix OLED (AMOLED) panel, or the like.

At least one holder 103 of the probe 110 may be provided in the vicinity of the manipulation panel 150 in order to mount the ultrasound probe 110. Therefore, when the ultrasonic diagnosis apparatus 100 is not used, the user mounts and keeps the ultrasound probe 110 in the holder 103 of the probe 110.

The display unit 160 may display ultrasound images obtained during an ultrasound diagnosis process. The display unit 160 may be connected and mounted in the main body 101 as illustrated in FIG. 21, but may also be detachable from the main body 101.

Also, the display unit 160 may include a plurality of display devices 161 and 162 and display different images at the same time. For example, the first display device 161 may display an ultrasound image obtained by imaging the subject, and the second display device 162 may display a registered image. The first display device 161 may display a 2D image obtained by imaging the subject, and the second display device 162 may display a 3D image.

Also, each of the display devices 161 and 162 may use a display panel such as a plasma display panel (PDP), the LCD panel, the LED panel, the OLED panel, or an AMOLED panel.

Figure 22:
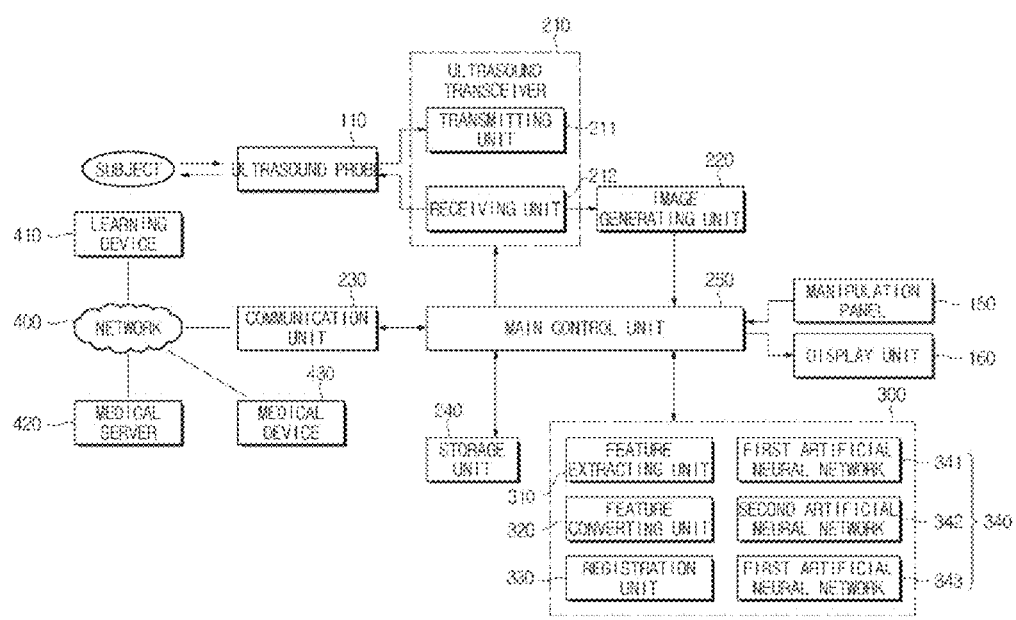
FIG. 22 is a control block diagram of an ultrasonic diagnosis apparatus according to an exemplary embodiment.

FIG. 22 is a control block diagram illustrating an ultrasonic diagnosis apparatus 100 according to an exemplary embodiment. As illustrated in FIG. 22, the ultrasonic diagnosis apparatus 100 according to an exemplary embodiment includes the ultrasound probe 110, an ultrasound transceiver 210, an image generating unit 220 (e.g., image generator), a communication unit 230 (e.g., communicator), a storage unit 240 (e.g., storage), an image registration device 300, and a main control unit 250 (e.g., main controller).

The communication unit 230 may be connected to another device and transmit and receive data with the connected device. In particular, the communication unit 230 may be connected to another device connected to a network 400, and receive various pieces of data for image registration. For example, the communication unit 230 may receive at least one artificial neural network 340 for image registration from another device, or receive a medical image to be used for image registration from other device.

Specifically, the communication unit 230 may receive the trained artificial neural network 340 from a learning device 410. Here, the learning device 410 is a device for learning the artificial neural network 340. As described above, supervised learning or unsupervised learning of the artificial neural network 340 may be performed using training data.

Also, the communication unit 230 may receive a medical image obtained by imaging the subject from a medical device 430. The medical image received through the communication unit 230 in this manner may be stored in the storage unit 240 and used to generate the registered image.

Here, the medical device 430 images the subject by a preset method and obtains the medical image. The medical device 430 may be a device having a modality different from the ultrasonic diagnosis apparatus 100. For example, the medical device 430 may be one of a magnetic resonance imaging (MRI) device, a computed tomography (CT) device, a positron emission tomography (PET) device, and a single photon emission computed tomography (SPECT) device.

Also, the communication unit 230 may receive information on a diagnostic history, a treatment schedule, and the like of the subject stored in a medical server 420, the medical image obtained using the various medical devices 430, and the like, and may also transmit an ultrasound image obtained based on an echo signal to the medical server 420.

Here, the medical server 420 manages medical information that can be used for treatment of the subject. For example, the medical server 420 may manage medical information such as a diagnostic history, a treatment schedule, and the like of the subject. Also, the medical server 420 may receive and manage the medical image from the medical device 430, and transmit the stored medical image to the ultrasonic diagnosis apparatus 100 according to a request of the ultrasonic diagnosis apparatus 100.

Furthermore, the communication unit 230 may perform data communication with another device according to various wired and/or wireless communication protocols, and preferably, perform data communication according to a digital imaging and communications in medicine (DICOM) standard.

The ultrasound probe 110 comes in contact with a surface of the subject, transmits an ultrasound to the subject, and receives a reflected echo ultrasound. For this purpose, the ultrasound probe 110 may include a transducer. Here, the transducer (T) refers to a device for converting a predetermined form of energy into a different form of energy. For example, the transducer (T) may convert electrical energy into wave energy, and wave energy into electrical energy.

Specifically, the transducer (T) may include a piezoelectric material or a piezoelectric thin film. When an alternating current is applied from an internal condenser such as a battery or an external power supply device to a piezoelectric material or a piezoelectric thin film, the piezoelectric material or the piezoelectric thin film vibrates at a predetermined frequency, and an ultrasound of a predetermined frequency is generated according to the vibration frequency.

On the other hand, when an ultrasound echo of a predetermined frequency reaches the piezoelectric material or the piezoelectric thin film, the piezoelectric material or the piezoelectric thin film vibrates at the frequency of the arrived echo ultrasound. In this case, the piezoelectric material or the piezoelectric thin film outputs an alternating current of a frequency corresponding to the vibration frequency.

Also, as the transducer (T), various types of transducers (T) such as a magnetostrictive ultrasonic transducer using a magnetostrictive effect of a magnetic substance, a piezoelectric ultrasonic transducer using a piezoelectric effect of a piezoelectric material, a capacitive micromachined ultrasonic transducer (cMUT) configured to transmit and receive an ultrasound using vibrations of several hundreds or thousands of micromachined thin films may be used. In addition, certain types of devices capable of generating an ultrasound according to an electrical signal or generating an electrical signal according to an ultrasound may be used as the transducer (T).

The ultrasound transceiver 210 may apply a driving signal to the ultrasound probe 110 or perform beamforming of the echo signal received from the ultrasound probe 110. The ultrasound transceiver 210 may include a receiving unit 212 (e.g., receiver) and a transmitting unit 211 (e.g., transmitter).

The transmitting unit 211 applies a driving signal to the ultrasound probe 110. Specifically, the transmitting unit 211 generates a driving pulse for forming a transmitting ultrasound according to a predetermined pulse repetition frequency (PRF).

Also, the transmitting unit 211 appropriately delays and outputs the driving pulse based on transmission directionality, and focuses the ultrasound transmitted to the subject.

The receiving unit 212 beamforms and outputs the echo signal received from the ultrasound probe 110. Specifically, the receiving unit 212 may appropriately delay the echo signal received based on reception directionality, and focus the echo signal.

Also, the receiving unit 212 may synthesize and output the delayed output echo signal. In this case, the receiving unit 212 simply synthesizes a plurality of echo signals and outputs the synthesized signal. Synthesizing may be performed by applying a predetermined weight to the echo signal. The weight to be applied to the echo signal may be determined independently from the echo signal, but may be determined based on the echo signal.

The image generating unit 220 generates an ultrasound image based on the echo signal output from the receiving unit 212. For example, the image generating unit 220 may generate at least one image of an A-mode image, a B-mode image, a D-mode image, an E-mode image, and an M-mode image based on the echo signal. In addition, the image generating unit 220 may also generate a 3D ultrasound image based on a plurality of ultrasound images obtained from the echo signal.

In this case, the image generating unit 220 may correspond to one or a plurality of processors. The processor may be implemented as an array of a plurality of logic gates, or implemented as a combination of a general-purpose microprocessor and a memory in which a program that can be executed in the microprocessor is stored. For example, the image generating unit 220 may be implemented as a general-purpose GPU.

The storage unit 240 stores various pieces of information for driving the ultrasonic diagnosis apparatus 100. For example, the storage unit 240 may store medical information on diagnosis of the subject such as the echo signal and the ultrasound image, and store a program for driving the ultrasonic diagnosis apparatus 100.

Also, the storage unit 240 may store the medical image received through the communication unit 230. In this case, the medical image may be obtained by the medical device 430 having a modality different from the ultrasonic diagnosis apparatus 100, and may be transmitted from the medical server 420 or the medical device 430 connected through the network 400.

Also, the storage unit 240 may include, for example, a high-speed random access memory, a magnetic disk, a synchronous dynamic random-access memory (SDRAM), a static random-access memory (SRAM), a dynamic random-access memory (DRAM), a read-only memory (ROM), etc., although it is understood that one or more other exemplary embodiments are not limited thereto.

Also, the storage unit 240 may be detachable from the ultrasonic diagnosis apparatus 100. For example, the storage unit 240 may include a compact flash card (CF card), a secure digital card (SD card), a smart media card (SM card), a multimedia card (MMC), a memory stick, etc., although it is understood that one or more other exemplary embodiments are not limited thereto. Also, the storage unit 240 provided outside the ultrasonic diagnosis apparatus 100 may transmit or receive data with the ultrasonic diagnosis apparatus 100 via wired or wireless communication.

The image registration device 300 registers an ultrasound image obtained by imaging the subject and a pre-obtained medical image. Any medical image can be registered with the ultrasound image.

Specifically, the image registration device 300 includes a feature extracting unit 310 (e.g., feature extractor), a feature converting unit 320 (e.g., feature converter), and a registration unit 330 (e.g., register or registration device).

The feature extracting unit 310 may extract the first feature vector group from the ultrasound image generated in the image generating unit 220 using a pre-trained first artificial neural network 341.

In this case, the first artificial neural network 341 may be trained without supervision in advance using training data including a plurality of ultrasound images. The first artificial neural network 341 is trained to extract features from the ultrasound image through unsupervised learning and outputs a feature vector corresponding to features of the input ultrasound image. For example, the first artificial neural network 341 may be pre-trained by the learning device 410 according to the above-described unsupervised learning method.

In this manner, hidden features of the first image may be extracted using the first artificial neural network 341. Hereinafter, extraction of the first feature vector group will be described in detail with reference to FIG. 23.

Figure 23:
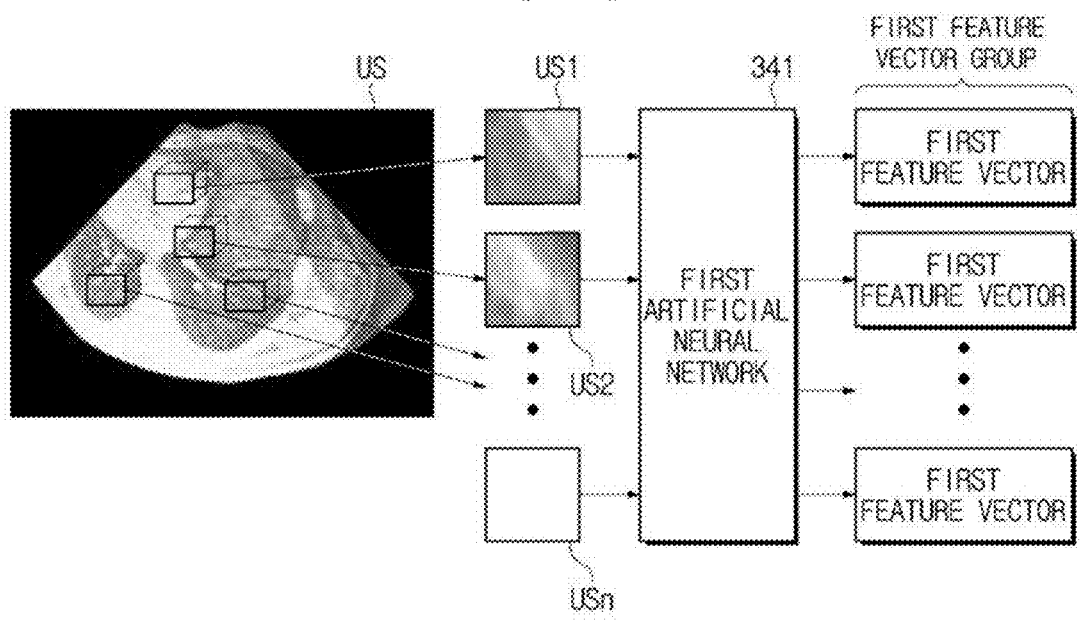
FIG. 23 is a diagram illustrating extraction of a first feature vector group.

FIG. 23 is a diagram illustrating extraction of a first feature vector group according to an exemplary embodiment.

As illustrated in FIG. 23, the feature extracting unit 310 extracts the first feature vector group from an ultrasound image US using the first artificial neural network 341. The first feature vector group includes a plurality of first feature vectors. In this case, the first feature vector is a geometrical expression of features of the input image, and the first feature vector may be extracted by the first artificial neural network 341.

Specifically, the feature extracting unit 310 separates a plurality of patch images US1 to USn from the ultrasound image US obtained in the image generating unit 220. In this case, the patch images US1 to USn may be separated into units of a preset size. The patch images US1 to USn may include a plurality of pixels. However, as illustrated in FIG. 23, when the obtained ultrasound image is a 3D image, the patch images US1 to USn may include at least one voxel. The voxel corresponds to a pixel of the 2D image and is a minimum unit of the 3D image. One of the patch images US1 to USn may include a plurality of adjacent voxels.

Also, the patch images US1 to USn may be obtained at preset intervals. For example, the feature extracting unit 310 may separate the patch images US1 to USn at intervals of single voxels.

Also, the patch images US1 to USn may be separated from only a preset region of the ultrasound image. For example, the patch images US1 to USn may be separated from only the region of interest (ROI).

The feature extracting unit 310 may generate the first feature vector group by inputting the plurality of patch images US1 to USn separated from the ultrasound image US to the first artificial neural network 341. In this case, the first feature vector group includes the plurality of first feature vectors extracted from each patch image.

Furthermore, the first feature vectors of the first feature vector group may be aligned according to a position of the corresponding patch image.

Meanwhile, the feature extracting unit 310 extracts the second feature vector group from the second image using a second artificial neural network 342. The second feature vector group includes a plurality of second feature vectors. In this case, the second feature vector represents a geometrical expression of the input second image feature, and the second feature vector may be extracted by the second artificial neural network 342.

In this case, the second artificial neural network 342 may be trained without supervision in advance using the plurality of medical images obtained by the medical device 430 having the same modality as the medical image to be registered as training data. The second artificial neural network 342 is trained to extract features hidden in the medical image through unsupervised learning, and outputs the feature vector corresponding to features of the input medical image.

Figure 24:
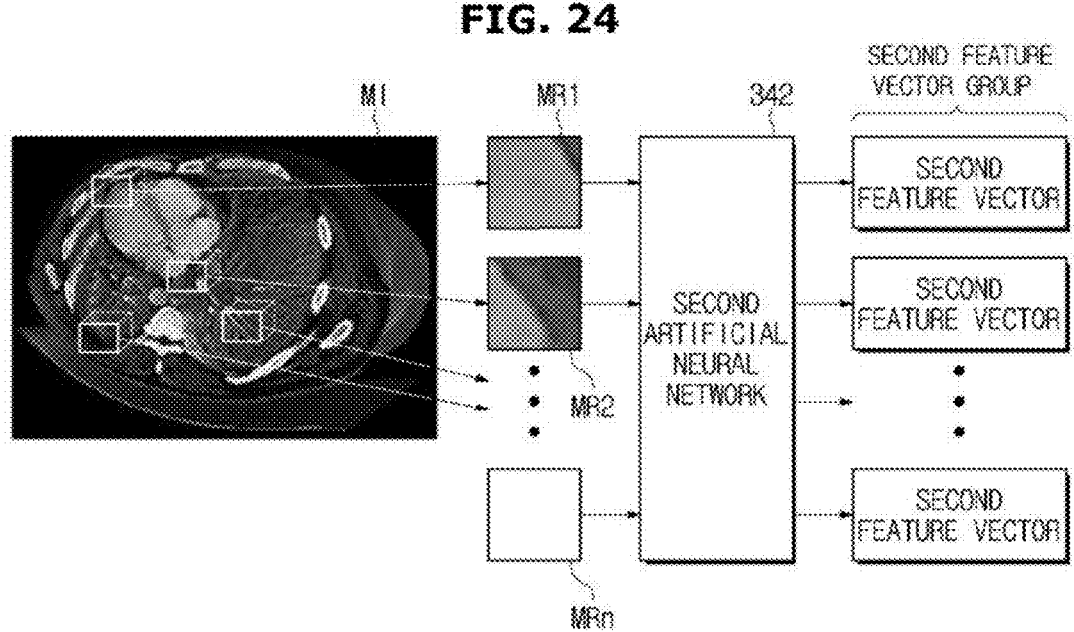
FIG. 24 is a diagram illustrating extraction of a second feature vector group.

FIG. 24 is a diagram illustrating extraction of a second feature vector group according to an exemplary embodiment.

As illustrated in FIG. 24, the feature extracting unit 310 extracts the second feature vector group from a pre-obtained medical image (MI) using the second artificial neural network 342.

Specifically, the feature extracting unit 310 separates a plurality of patch images MR1 to MRn from a pre-obtained medical image (MI). In this case, the patch images MR1 to MRn may be separated into units of a preset size.

The patch images MR1 to MRn may include a plurality of pixels. However, as illustrated in FIG. 24, when the medical image (MR) is a 3D image, the patch images MR1 to MRn may include at least one voxel.

Also, the patch images MR1 to MRn may be obtained at preset intervals. For example, the patch images MR1 to MRn may be separated while moving in units of voxels.

Furthermore, the patch images MR1 to MRn may be separated from only a preset region of the magnetic resonance image. For example, the patch images MR1 to MRn may be separated from only the region of interest (ROI).

The feature extracting unit 310 may generate the second feature vector group including a plurality of second feature vectors by inputting, to the second artificial neural network 342, the plurality of patch images MR1 to MRn separated from the medical image (MI). In this case, the second feature vector may be aligned according to positions of the patch images US1 to USn.

The feature converting unit 320 converts the first feature vector group and the second feature vector group into the same feature vector space. The ultrasound image and the magnetic resonance image have different features due to a difference of obtaining methods thereof. The first feature vector group extracted from the ultrasound image and the second feature vector group extracted from the medical image are positioned in different feature spaces. Therefore, in order to register the ultrasound image and the magnetic resonance image, the first feature vector group and the second feature vector group may be converted into the same feature space.

That is, the feature converting unit 320 may convert the first feature vector group and the second feature vector group into the same feature space using a third artificial neural network 343.

In this case, a correlation between the first feature vector and the second feature vector is learned without supervision in the third artificial neural network 343. The first feature vector and the second feature vector extracted from the same part of the registered ultrasound image and medical image may be used as training data for supervised learning of the third artificial neural network 343.

Meanwhile, as described above, in order to train the third artificial neural network 343, the first artificial neural network 341 and second artificial neural network 342 trained without supervision may be used. Hereinafter, supervised learning of the third artificial neural network 343 will be described in detail.

Figure 25:
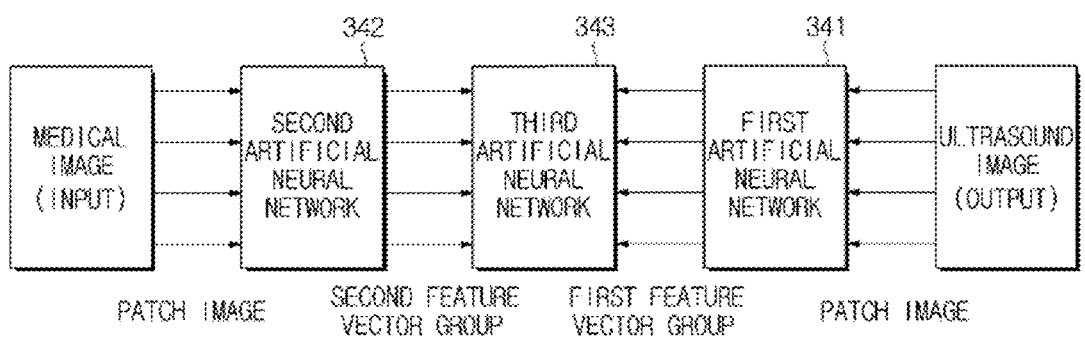
FIG. 25 is a diagram illustrating a supervised learning of a third artificial neural network according to an exemplary embodiment.

FIG. 25 is a diagram illustrating a supervised learning of a third artificial neural network according to an exemplary embodiment.

As illustrated in FIG. 25, supervised learning of the third artificial neural network 343 may be performed using the first artificial neural network 341 and the second artificial neural network 342.

Specifically, when the plurality of patch images separated from the ultrasound image are input to the first artificial neural network 341, the plurality of first feature vectors corresponding to each patch image are output.

Also, when the plurality of patch images separated from the medical image registered with the ultrasound image are input to the second artificial neural network 342, the plurality of second feature vectors corresponding to each patch image are output.

In this manner, the third artificial neural network 343 may be trained using the first feature vector group and the second feature vector group generated by the first artificial neural network 341 and the second artificial neural network 342, respectively.

When any first feature vector is selected as an output of the third artificial neural network 343 from the first feature vector group, the second feature vector corresponding to the first feature vector selected as an output of the third artificial neural network 343 is selected as an input, the connection strength of the third artificial neural network 343 may be adjusted according to the error backpropagation algorithm.

In this case, the second feature vector corresponding to the first feature vector may refer to the feature vector extracted from a region of the medical image corresponding to a region of the ultrasound image from which the first feature vector is extracted.

Figure 26:
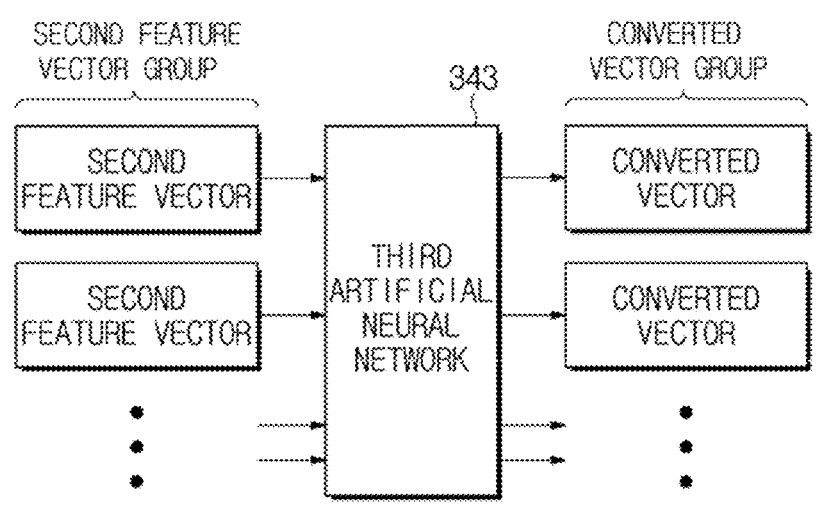
FIG. 26 is a diagram illustrating a conversion of a feature space.

FIG. 26 is a diagram illustrating a conversion of a feature space according to an exemplary embodiment.

As illustrated in FIG. 26, the feature converting unit 320 may generate the converted vector group using the third artificial neural network 343 that is trained without supervision as illustrated in FIG. 24. Specifically, the converted feature vector may be generated by inputting, to the third artificial neural network 343, the second feature vector group obtained in the pre-obtained medical image.

As described above, through supervised learning, the third artificial neural network 343 outputs the first feature vector that has a correlation with the second feature vector. The feature converting unit 320 may sequentially input the second feature vector and convert the vector into the first feature vector having a correlation.

In this case, each converted feature vector of the converted feature vector group may be aligned according to a position of the patch image corresponding to the first feature vector having a correlation with the corresponding second feature vector.

Figure 27:
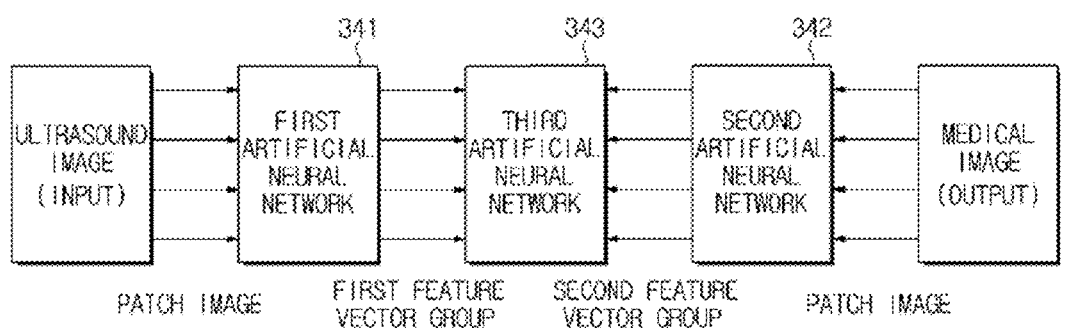
FIG. 27 is a diagram illustrating a conversion of a feature space.

FIG. 27 is a diagram illustrating a conversion of a feature space according to another exemplary embodiment.

Figure 28:
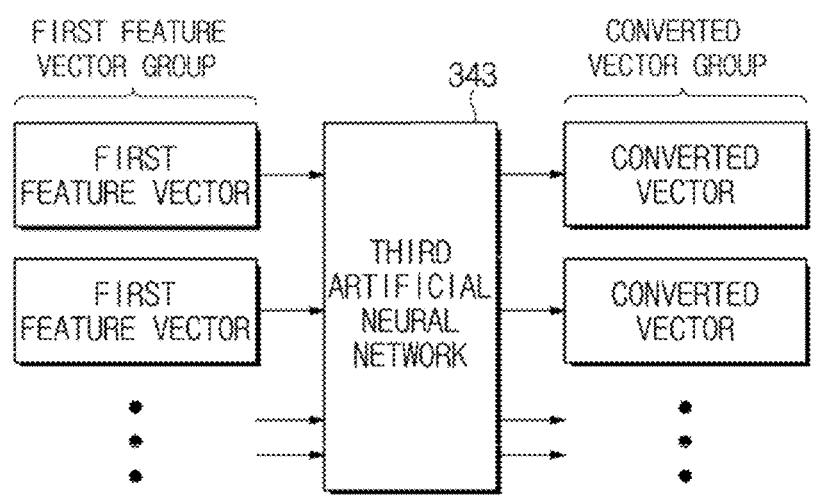
FIG. 28 is a diagram illustrating a learning method of a third artificial neural network used in another exemplary embodiment of conversion of a feature space.

FIG. 28 is a diagram illustrating a method of learning a third artificial neural network used in conversion of a feature space according to another exemplary embodiment.

As illustrated in FIG. 27, the feature converting unit 320 may convert the first feature vector group into the converted feature vector group. In this case, the third artificial neural network 343 used for generating the converted feature vector group may be trained without supervision by a method different from FIG. 26.

The first feature vector and the second feature vector do not have a linear relation. In order to convert the first feature vector group into the converted feature vector group, the learning method of the third artificial neural network 343 may be changed.

Specifically, as illustrated in FIG. 28, supervised learning may be performed using a plurality of first feature vector groups extracted from the ultrasound image as inputs of the third artificial neural network 343 and a plurality of second feature vector groups extracted from the medical image as outputs of the third artificial neural network 343

Hereinafter, for convenience of description, it will be described that the converted feature vector is generated by converting the second feature vector group according to the present exemplary embodiment.

Referring again to FIG. 22, the registration unit 330 registers the ultrasound image and the medical image. In image registration, images of different coordinate systems are converted into the same coordinate system. The registration unit 330 may perform movement translation, scaling translation, and rotation translation of the other image based on any image of the first image and the second image, convert coordinate systems of the first image and the second image to the same coordinate system, and register the ultrasound image and the medical image.

The registration unit 330 may register the ultrasound image and the medical image by applying a predetermined registration function to at least one image among the ultrasound image and the medical image. In this case, the registration function is a function for converting the ultrasound image and the medical image into the same coordinate system.

The registration unit 330 may determine the parameter of the registration function based on the first feature vector group and the converted feature vector group. As described above, the first feature vector group represents features of the ultrasound image. In the converted feature vector, features of the medical image are converted into features of the ultrasound image and represented.

That is, the first feature vector group represents features of the ultrasound image, and the converted feature vector group represents features of the medical image converted into features of the ultrasound image. Therefore, the parameter of the registration function may be determined based on an error between the first feature vector group and the converted feature vector.

The registration unit 330 may calculate an error between the first feature vector group and the converted feature vector group while changing the parameter of the registration function, and determine the parameter of the registration function based on the calculated error. For example, a parameter having a minimum error between vector groups may be determined as the parameter of the registration function.

Also, the registration unit 330 applies the determined parameter of the registration function to at least one image among the ultrasound image and the medical image, matches coordinate systems of the ultrasound image and the medical image, and generates the registered image.

The registered image generated in this manner may be displayed for the user through the display unit 160.

Meanwhile, the main control unit 250 may control overall operations of the ultrasonic diagnosis apparatus 100. Specifically, the main control unit 250 may generate the ultrasound image of the subject by controlling each component, register the generated ultrasound image and the pre-stored medical image, and display the registered image. Also, the main control unit 250 may control the communication unit 230 such that the medical image to be registered with the ultrasound image is received, and store the medical image received through the communication unit 230 in the storage unit 240.

The main control unit 250 may correspond to one or a plurality of processors. In this case, the processor may be implemented as an array of a plurality of logic gates, or implemented as a combination of a general-purpose microprocessor and a memory in which a program that can be executed in the microprocessor is stored.

Figure 29:
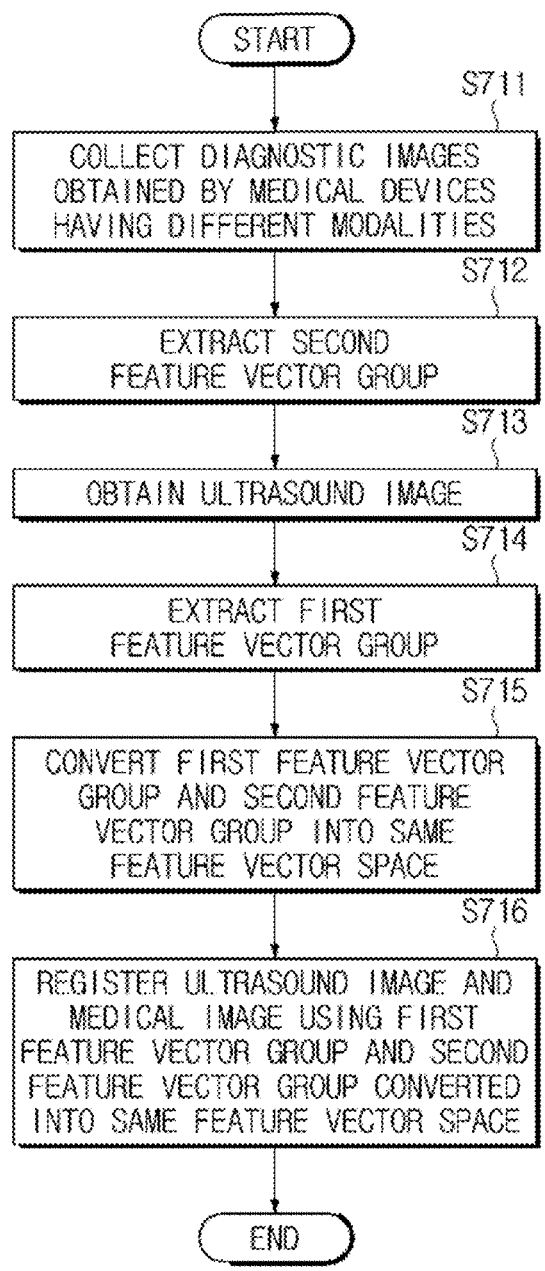
FIG. 29 is a flowchart illustrating a method of controlling an ultrasonic diagnosis apparatus according to an exemplary embodiment.

FIG. 29 is a flowchart illustrating a method of controlling an ultrasonic diagnosis apparatus according to an exemplary embodiment.

As illustrated in FIG. 29, the ultrasonic diagnosis apparatus 100 collects or obtains the medical image obtained by the medical device 430 (operation S711). For example, the ultrasonic diagnosis apparatus 100 may receive the medical image obtained by imaging the subject in the medical device 430, and store the received medical image. In this case, another medical device 430 may refer to a diagnostic device having a modality different from the ultrasonic diagnosis apparatus 100.

The ultrasonic diagnosis apparatus 100 extracts the second feature vector group from the collected medical image (operation S712). The second artificial neural network 342 may be used to generate the second feature vector group. The second artificial neural network 342 is trained based on the plurality of medical images obtained by the medical device 430, and trained without supervision to extract features from the medical image.

The ultrasonic diagnosis apparatus 100 obtains the ultrasound image by imaging the subject (operation S713). Specifically, the ultrasound image may be generated based on an echo signal reflected when the ultrasound is radiated to the subject.

The ultrasonic diagnosis apparatus 100 extracts the first feature vector group from the ultrasound image (operation S714). The first artificial neural network 341 may be used to generate the first feature vector group. The first artificial neural network 341 is trained based on the plurality of ultrasound images obtained by the ultrasonic diagnosis apparatus 100, and trained without supervision to extract features from the ultrasound image.

The ultrasonic diagnosis apparatus 100 converts the first feature vector group and the second feature vector group into the same feature vector space (operation S715). As described above, since the medical image and the ultrasound image represent different features due to a difference between obtaining methods thereof, features of the medical image and the ultrasound image may match for registration. That is, the first feature vector group representing features of the ultrasound image and the second feature vector group representing features of the medical image may be converted into the same feature vector space.

In order to perform conversion into the feature vector space in this manner, the third artificial neural network 343 in which a correlation between the first feature vector and the second feature vector is learned may be used. The second artificial neural network 342 may be trained with supervision using the first feature vector group and the second feature vector group obtained in the registered ultrasound image and medical image as described above.

The ultrasonic diagnosis apparatus 100 registers the ultrasound image and the medical image using the first feature vector group and the second feature vector group converted into the same feature vector space (operation S716).

Since images obtained by diagnostic devices having different modalities are registered using an artificial neural network, it is possible to improve accuracy of image registration.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units or elements of the above-described apparatuses and devices can include circuitry, a processor, a microprocessor, etc., and may execute a computer program stored in a computer-readable medium.

The foregoing exemplary embodiments and advantages are merely exemplary and are not to be construed as limiting. The present teaching can be readily applied to other types of apparatuses. The description of the exemplary embodiments is intended to be illustrative, and not to limit the scope of the claims, and many alternatives, modifications, and variations will be apparent to those skilled in the art.

What is claimed is:

1. An image registration device, comprising:
    a feature extractor configured to extract, from a first medical image, a first feature group and to extract, from a second medical image, a second feature group;
    a feature converter configured to convert, using a converted neural network in which a correlation between features is learned, the extracted second feature group to correspond to the extracted first feature group, to obtain a converted group; and
    a register configured to register the first medical image and the second medical image based on the converted group and the extracted first feature group.

2. The device according to claim 1, wherein the register is configured to determine a registration function based on an error between the converted group and the extracted second feature group, and to register the first medical image and the second medical image by applying the determined registration function.

3. The device according to claim 1, wherein the converted neural network is trained without supervision based on the registered first medical image and the registered second medical image.

4. The device according to claim 3, wherein the converted neural network is trained without supervision according to a relation between features extracted from a same part of the registered image.

5. The device according to claim 4, wherein the converted neural network has a multilayer perceptron structure.

6. The device according to claim 1, further comprising:
    a first feature neural network in which extraction of the first feature group is learned without supervision using a plurality of first medical images corresponding to a first modality of a medical device; and
    a second feature neural network in which extraction of the second feature group is learned without supervision using a plurality of second medical images corresponding to a second modality of another medical device.

7. The device according to claim 6, wherein the feature extractor is configured to extract features of the first medical image and the second medical image based on the first feature neural network and the second feature neural network, respectively.

8. The device according to claim 1, wherein the first medical image is a medical image obtained in real time, and the second medical image is a pre-obtained medical image.

9. The device according to claim 7, wherein the first medical image is an ultrasound image, and the second medical image is an image of a computed tomography image, a magnetic resonance image, a positron emission tomography image, or a single photon emission computed tomography image.

10. The device according to claim 1, wherein the first medical image is a pre-obtained medical image, and the second medical image is obtained in real time.

11. The device according to claim 1, wherein the first medical image and the second medical image are obtained by medical devices having different modalities.

12. An image registration method, comprising:
    extracting, from a first medical image, a first feature group and extracting, from a second medical image, a second feature group;
    converting, using a converted neural network in which a correlation between features is learned, the extracted first feature group to correspond to the extracted second feature group, to obtain a converted group; and
    registering the first medical image and the second medical image based on the converted group and the extracted second feature group.

13. The method according to claim 12, wherein the registering comprises:
    determining a registration function based on an error between the converted group and the extracted second feature group; and
    applying the determined registration function to one of the first medical image and the second medical image.

14. The method according to claim 12, wherein the extracting comprises:
    extracting the first feature group using a first feature neural network in which feature extraction is learned without supervision using a plurality of first medical images corresponding to a first modality of a medical device; and
    extracting the second feature group using a second feature neural network in which feature extraction is learned without supervision using a plurality of second medical images corresponding to a second modality of another medical device.

15. The method according to claim 14, wherein the first feature neural network, the second feature neural network, and the converted neural network each have a multilayer perceptron structure.

16. An ultrasonic diagnosis apparatus, comprising:
    an image obtainer configured to obtain an ultrasound image of a subject;
    a feature extractor configured to extract, from a medical image obtained in advance by imaging the subject, a first feature group and to extract, from the obtained ultrasound image, a second feature group;

a feature converter configured to convert, using a converted neural network in which a correlation between features is learned, the extracted first feature group and the extracted second feature group into a same feature space; and a register configured to register the obtained ultrasound image and the obtained medical image based on the first feature group and the second feature group converted into the same feature space.

17. The apparatus according to claim 16, wherein the first feature group is generated by a first feature neural network that is trained without supervision in advance based on a plurality of medical images, and the second feature group is generated by a second feature neural network that is trained without supervision in advance based on a plurality of medical images.

18. The apparatus according to claim 16, further comprising a communicator configured to receive the medical image from an external device.

19. The apparatus according to claim 16, wherein the register is configured to determine a registration function based on an error between the first feature group and the second feature group converted into the same feature space, to apply the determined registration function to the medical image, and to register the medical image and the ultrasound image.

20. The apparatus according to claim 16, wherein the converted neural network is trained with supervision based on the registered ultrasound image and the registered medical image.

21. An image registration device, comprising:
a feature converter configured to obtain a converted group by converting, using a converted neural network in which a correlation between features is learned, a second feature group to correspond to a first feature group, the second feature group obtained from a second medical image corresponding to a second modality of a medical device and the first feature group obtained from a first medical image corresponding to a first modality of another medical device; and a register configured to register the first medical image and the second medical image based on the converted group and the first feature group.

22. The device according to claim 21, wherein the register is configured to determine a registration function based on an error between the converted group and the second feature group, and to register the first medical image and the second medical image by applying the determined registration function.

23. The device according to claim 21, wherein the converted neural network is trained without supervision based on the registered first medical image and the registered second medical image.

24. The device according to claim 21, wherein the converted neural network has a multilayer perceptron structure.

25. The device according to claim 21, wherein:
the first medical image is a medical image obtained in real time, and the second medical image is a pre-obtained medical image; or the second medical image is the medical image obtained in real time, and the first medical image is the pre-obtained medical image.

26. A non-transitory computer readable recording medium having recorded thereon a program executable by a computer for performing the method of claim 12.

* * * * *